United States Patent
Liu et al.

(10) Patent No.: US 11,828,507 B2
(45) Date of Patent: Nov. 28, 2023

(54) AIR CONDITIONING SYSTEM AND CONTROL METHOD THEREFOR

(71) Applicant: HANGZHOU SANHUA RESEARCH INSTITUTE CO., LTD., Zhejiang (CN)

(72) Inventors: Qiaofeng Liu, Zhejiang (CN); Junqi Dong, Zhejiang (CN); Shiwei Jia, Zhejiang (CN)

(73) Assignee: HANGZHOU SANHUA RESEARCH INSTITUTE CO., LTD., Zhejiang (CN)

( * ) Notice: Subject to any disclaimer, the term of this patent is extended or adjusted under 35 U.S.C. 154(b) by 476 days.

(21) Appl. No.: 16/955,704

(22) PCT Filed: Sep. 25, 2019

(86) PCT No.: PCT/CN2019/107876
§ 371 (c)(1),
(2) Date: Jun. 18, 2020

(87) PCT Pub. No.: WO2020/063678
PCT Pub. Date: Apr. 2, 2020

(65) Prior Publication Data
US 2021/0010733 A1    Jan. 14, 2021

(30) Foreign Application Priority Data

Sep. 25, 2018 (CN) .......................... 201811119066.7
Sep. 26, 2018 (CN) .......................... 201811123981.3
(Continued)

(51) Int. Cl.
F25B 49/02 (2006.01)
F25B 13/00 (2006.01)
F25B 41/385 (2021.01)

(52) U.S. Cl.
CPC .............. F25B 49/02 (2013.01); F25B 13/00 (2013.01); F25B 41/385 (2021.01);
(Continued)

(58) Field of Classification Search
CPC ........ F25B 49/02; F25B 13/00; F25B 41/385; F25B 2600/21; F25B 2600/2501; F25B 2700/21151; F25B 2700/21152
See application file for complete search history.

(56) References Cited

U.S. PATENT DOCUMENTS 5,819,551 A * 10/1998 Fukumoto .......... B60H 1/00907
                                                       62/324.1
2007/0125121 A1    6/2007  Suzuki et al.
2008/0197206 A1    8/2008  Murakami et al.

FOREIGN PATENT DOCUMENTS

CN    101666560 A    3/2010
CN    102422093 A    4/2012
(Continued)

OTHER PUBLICATIONS

Hangzhou, Automobile Air Conditioning System, Aug. 21, 2013, CN103256746A, Whole Document (Year: 2013).*
(Continued)

Primary Examiner — Larry L Furdge
(74) Attorney, Agent, or Firm — Knobbe, Martens, Olson & Bear, LLP

(57) ABSTRACT

The present application discloses an air conditioning system and a control method therefore. An intermediate heat exchanger can include a first heat exchange portion and a second heat exchange portion, a first end of the first heat exchange portion is in communication with an inlet of a compressor, a second end of the first heat exchange portion is communicable with an outlet of a second heat exchanger and/or a second end of the first heat exchanger, a first end of the second heat exchange portion is communicable with a (Continued)

first end of the first heat exchanger, and a second end of the second heat exchange portion is communicable with an inlet of the second heat exchanger and/or an outlet of the compressor. In the refrigeration mode, the first branch can have an adjustable amount of flow.

1 Claim, 19 Drawing Sheets

(30) Foreign Application Priority Data

Oct. 19, 2018 (CN) .......................... 201811219051.8
Oct. 19, 2018 (CN) .......................... 201811219057.5

(52) U.S. Cl.
CPC ... *F25B 2600/21* (2013.01); *F25B 2600/2501* (2013.01); *F25B 2700/21151* (2013.01); *F25B 2700/21152* (2013.01)

(56) References Cited

FOREIGN PATENT DOCUMENTS

| | | |
|---|---|---|
| CN | 102452297 A | 5/2012 |
| CN | 102654324 A | 9/2012 |
| CN | 102679609 A | 9/2012 |
| CN | 102848876 A | 1/2013 |
| CN | 103256746 | 8/2013 |
| CN | 103256746 A | 8/2013 |
| CN | 103256747 A | 8/2013 |
| CN | 103373193 A | 10/2013 |
| CN | 203286741 U | 11/2013 |
| CN | 103673123 A | 3/2014 |
| CN | 103712277 A | 4/2014 |
| CN | 103807936 A | 5/2014 |
| CN | 103940135 A | 7/2014 |
| CN | 104121720 | 10/2014 |
| CN | 104121720 A | 10/2014 |
| CN | 104121724 A | 10/2014 |
| CN | 104214837 A | 12/2014 |
| CN | 105180489 A | 12/2015 |
| CN | 105247297 A | 1/2016 |
| CN | 105579259 | 5/2016 |
| CN | 105758075 A | 7/2016 |
| CN | 105910223 A | 8/2016 |
| CN | 106004323 A | 10/2016 |
| CN | 106247668 A | 12/2016 |
| CN | 106904058 A | 6/2017 |
| CN | 206637775 U | 11/2017 |
| CN | 206847111 U | 1/2018 |
| CN | 107791780 A | 3/2018 |
| CN | 207416860 U | 5/2018 |
| CN | 108248336 | 7/2018 |
| CN | 108518774 A | 9/2018 |
| EP | 1519127 A1 * 3/2005 | .............. F25B 40/00 |
| EP | 2314953 B1 | 6/2018 |
| FR | 3033290 A1 | 9/2016 |
| FR | 3058933 A1 | 5/2018 |
| JP | H8-233385 A | 9/1996 |
| JP | 2000-283611 A | 10/2000 |
| JP | 2001-001754 A | 1/2001 |
| JP | 2003-054249 A | 2/2003 |
| JP | 2005289152 | 10/2005 |
| JP | 2005291622 A | 10/2005 |
| JP | 2016-042001 A | 3/2016 |
| JP | 2016049915 A | 4/2016 |
| JP | 2016223705 A | 12/2016 |
| JP | 2018-075922 A | 5/2018 |
| WO | WO 2012118198 | 9/2012 |
| WO | 2016/203624 A1 | 12/2016 |
| WO | 2017122479 A1 | 7/2017 |
| WO | 2017/183588 A1 | 10/2017 |
| WO | 2018/079034 A1 | 5/2018 |

OTHER PUBLICATIONS

First Office Action of Chinese Patent Application No. 201811119066. 7—9 pages (dated Mar. 24, 2021).
Extended European Search Report in EP Application No. 19866841.0 dated Nov. 29, 2021 in 13 pages.
International Search Report dated Dec. 30, 2019 in International Application No. PCT/CN2019/107876.
Office Action of Chinese Patent Application No. 201811123981.3, including its English Translation—21 pages (dated Aug. 25, 2020).
Notice of Allowance for Chinese Application No. 201811123981.3 dated Apr. 21, 2021 in 7 pages.
Notice of Allowance for Chinese Application No. 201811219057.5 dated Jun. 17, 2021 in 6 pages.
Office Action dated Aug. 18, 2023 in Chinese Application No. 201811219051.8.

* cited by examiner

AIR CONDITIONING SYSTEM AND CONTROL METHOD THEREFOR

CROSS-REFERENCE TO RELATED APPLICATIONS

The present patent application is a National Phase of International Application No. PCT/CN2019/107876, filed on Sep. 25, 2019, which claims priority to Chinese Patent Application No. 201811119066.7, filed on Sep. 25, 2018 and titled as "AIR CONDITIONING SYSTEM AND CONTROL METHOD THEREFOR", Chinese Patent Application No. 201811123981.3, filed on Sep. 26, 2018 and titled as "AIR CONDITIONING SYSTEM AND CONTROL METHOD THEREFOR", Chinese Patent Application No. 201811219051.8, filed on Oct. 19, 2018 and titled as "AIR CONDITIONING SYSTEM AND CONTROL METHOD THEREFOR", and Chinese Patent Application No. 201811219057.5, filed on Oct. 19, 2018 and titled as "AIR CONDITIONING SYSTEM AND CONTROL METHOD THEREFOR", the contents of which are incorporated herein by reference in its entirety.

TECHNICAL FIELD

The present application relates to a technical field of heat management.

BACKGROUND

At present, an intermediate heat exchanger may be integrated in some air conditioning systems for improving performances thereof. For example, the intermediate heat exchanger can improve a cooling performance of an air conditioning system. However, when an air conditioning system is operating at a high temperature and a high frequency, the intermediate heat exchanger may increase a suction superheat degree of a compressor, leading to a great challenge for the compressor. Therefore, it is urgent to modify the existing technology, so as to improve the performances of the air conditioning system.

SUMMARY

The present application provides an air conditioning system and a control method therefor, in order to improve the performances of the air conditioning system.

A first aspect of the present application provides an air conditioning system. The air conditioning system includes a compressor, a first heat exchanger, a second heat exchanger, an intermediate heat exchanger, a first branch, and a first throttle element disposed at an inlet of the second heat exchanger. The intermediate heat exchanger includes a first heat exchange portion and a second heat exchange portion, the first heat exchange portion and the second heat exchange portion are capable of heat exchanging, a first end of the first heat exchange portion is in communication with an inlet of the compressor, a second end of the first heat exchange portion is communicable with an outlet of the second heat exchanger and/or a second end of the first heat exchanger, a first end of the second heat exchange portion is communicable with a first end of the first heat exchanger, and a second end of the second heat exchange portion is communicable with the inlet of the second heat exchanger and/or an outlet of the compressor.

A second aspect of the present application provides a control method for an air conditioning system, applied to any air conditioning system provided by the present application. The control method includes: in the refrigeration mode, acquiring a suction temperature and a suction pressure of the compressor by a sensor provided at the inlet of the compressor; calculating a suction superheat degree of the compressor based on the suction temperature and the suction pressure, and determining whether the suction superheat degree of the compressor exceeds a preset range or not; if the suction superheat degree of the compressor exceeds the preset range, acting on the first branch in such a manner that the amount of flow of the first branch is adjusted, acquiring the suction temperature and the suction pressure again, and calculating the suction superheat degree; and if the suction superheat degree of the compressor does not exceed the preset range, stopping the acting on the first branch.

A third aspect of the present application provides a control method for an air conditioning system, which is applied to the air conditioning system provided by the present application. The control method includes: in the refrigeration mode, acquiring an exhaust temperature of the compressor by a sensor provided at the outlet of the compressor; determining whether the exhaust temperature of the compressor exceeds a preset range or not; if the exhaust temperature of the compressor exceeds the preset range, acting on the first branch in such a manner that the amount of flow of the first branch is adjusted, and acquiring the exhaust temperature again; and if the exhaust temperature of the compressor does not exceed the preset range, stopping the acting on the first branch.

The technical solutions provided by the present application can achieve the following beneficial effects.

In the present application, during the refrigeration circulation, by providing the first branch, only a part of the high-pressure refrigerant flowing out of the second heat exchanger passes through the intermediate heat exchanger by adjusting the amount of flow of the first branch, which weakens a heat exchange capacity of the intermediate heat exchanger, thereby effectively controlling the suction superheat degree of the compressor in such a manner that the compressor can operate in a high-temperature environment with high efficiency and the exhaust temperature of the compressor can be kept within an appropriate range.

It should be understood that the above general description and the following detailed description are illustrative and do not limit the present application.

Figure 1:
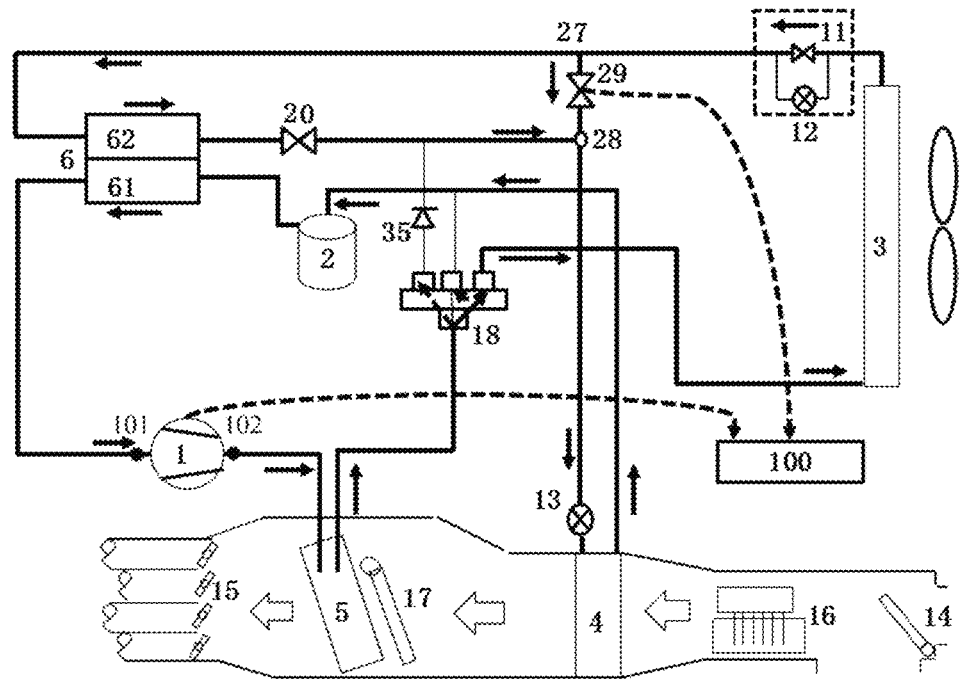
FIG. 1 is a schematic diagram of an air conditioning system in a refrigeration mode according to a first embodiment of the present application.

The drawings herein are incorporated into and constitute a part of the specification, illustrating embodiments according to the present application, and are used to explain the principles of the present application together with the specification.

DETAIL DESCRIPTION OF EMBODIMENTS

In order to clearly explain technical problems to be solved by the present application, adopted technical solutions and achieved technical effects, the technical solutions of embodiments of the present application will be described in detail with reference to the drawings. Obviously, the described embodiments are merely parts of, rather than all of the embodiments of the present application. Based on the embodiments in the present application, all other embodiments obtained by those skilled in the art without paying creative efforts shall fall within the protection scope of the present application. In one or more embodiments, the air conditioning system can be applied to a home air conditioning system, a car air conditioning system, or a commercial air conditioning system, among them, the car air conditioning system, as an example, is described below.

As shown in FIG. 1 to FIG. 34, the present application provides an air conditioning system, which has a plurality of operation modes such as a refrigeration mode, a heating mode, a dehumidification mode, a defrost mode, etc. The air conditioning system includes a conditioning cabinet for adjusting a temperature and/or humidity inside a car. The air conditioning system further includes a compressor 1, an accumulator 2, a first heat exchanger 3, a second heat exchanger 4, a third heat exchanger 5, and an intermediate heat exchanger 6. An air flue is provided in the conditioning cabinet. The air flue has one end provided with a first air door 14 for circulating air into the air flue, and another end provided with a grid 15 for supplying air into the car. In the air flue, an air blower 16, a second heat exchanger 4, and a third heat exchanger 5 are sequentially arranged from an inlet to an outlet of the air flue. A second air door 17 is provided at the third heat exchanger 5, for controlling air flow passing through the third heat exchanger 5. A first throttle element 13 is provided at an inlet of the second heat exchanger 4, for throttling refrigerant flowing into the second heat exchanger 4 and reducing pressure. The above-mentioned third heat exchanger 5 and second heat exchanger 4 can selectively perform heating, cooling and defogging according to working conditions in the cabin. It can be understood that the above-mentioned third heat exchanger 5 and second heat exchanger 4 can be arranged not only inside the car, but also outside the car, and blow the air into the car through an air supply pipe. The above-mentioned intermediate heat exchanger 6 includes a first heat exchange portion 61 and a second heat exchange portion 62. The first heat exchange portion 61 and the second heat exchange portion 62 are mutually independent, and thus fluid flows in the first heat exchange portion 61 and the second heat exchange portion 62 are mutually independent, but they can exchange heat with each other. Specifically, in the intermediate heat exchanger 6 according to the first embodiment, the first heat exchange portion 61 is configured to flow in relatively low-pressure refrigerant, and the second heat exchange portion 62 is configured to flow in relatively high-pressure refrigerant. The intermediate heat exchanger 6 can be a shell-and-tube heat exchanger or two parallel channel-type heat exchanger. The present embodiment adopts the shell-and-tube heat exchanger. Specifically, the second heat exchange portion 62 can be sleeved in a tube of the first heat exchange portion 61, and they are mutually sealed and separated; or the first heat exchange portion 61 can be sleeved in a tube of the second heat exchange portion 62, and they are mutually sealed and separated, as long as the heat exchange can occur therebetween.

The air conditioning system further includes a fluid switching device. The fluid switching device includes four ports. A first port of the fluid switching device is in communication with an outlet of third heat exchanger 5, a fourth port of the fluid switching valve device is communicable with an inlet of the second heat exchanger 4 and/or a first end of the first heat exchanger 3 (the first valve 29), a third port of the fluid switching device is in communication with an inlet of the accumulator 2, and a second port of the fluid switching device is in communication with a second end of the first heat exchanger 3. Specifically, the fluid switching device may be composed of a fluid switching valve 18 and a shut-off valve 35. The fluid switching valve 18 includes four ports, a first port of the fluid switching valve 18 is in communication with the outlet of the third heat exchanger 5, a fourth port of the fluid switching valve 18 is in communication with the shut-off valve 35, the shut-off valve 35 is communicable with the inlet of the second heat exchanger 4 and/or the first end of the first heat exchanger 3 (the first valve 29), a third port of the fluid switching valve 18 is in communication with an inlet of the accumulator 2, and a second port of the fluid switching valve 18 is in communication with the second end of the first heat exchanger 3.

The above-mentioned fluid switching valve has a first operation mode and a second operation mode. In the first operation mode of the fluid switching valve 18, the first port of the fluid switching valve 18 is in communication with the second port of the fluid switching valve 18. In the second operation mode of the fluid switching valve 18, the first port of the fluid switching valve 18 is in communication with the fourth port of the fluid switching valve 18, and meanwhile, the second port of the fluid switching valve 18 is in communication with the third port of the fluid switching valve 18.

In the present embodiment, the respective components are connected as follows. An outlet of the compressor 1 is in communication with the inlet of the third heat exchanger 5, and the outlet of the third heat exchanger 5 is in communication with the first port of the fluid switching valve 18. It can be understood that, the outlet of the compressor 1 and the first port of the fluid switching valve 18 can be connected through a section of a pipeline, i.e., the third heat exchanger 5 and the section of the pipeline are connected in series. The first end of the first heat exchange portion 61 is in communication with the inlet of the compressor 1, the second end of the first heat exchange portion 61 is in communication with the outlet of the accumulator 2, the inlet of the accumulator 2 is communicable with the second end of the first heat exchanger 3 via the fluid switching valve 18 and is also communicable with the outlet of the second heat exchanger 4; the first end of the second heat exchange portion 62 is communicable with the first end of the first heat exchanger 3, and the second end of the second heat exchange portion 62 is communicable with the first throttle element 13.

The air conditioning system provided by the present embodiment of the present application can be adjusted to different operation modes according to actual needs. When cooling is required in the cabin during the summer, the air conditioning system is switched to the refrigeration mode; when heating is required in the cabin during the winter, the air conditioning system is switched to the heating mode; and when it is necessary to remove the moisture of air in the cabin or vapor on glass, the dehumidification (defogging) mode is switched on.

First Embodiment

As shown in FIG. 1 to FIG. 5, a first branch is provided between the first end of the first heat exchanger 3 and the first throttle element 13. Specifically, a first node 27 is provided on a pipeline between the first end of the first heat exchanger 3 and the first end of the second heat exchange portion 62, a second node 28 is provided on a pipeline between the second end of the second heat exchange portion 62 and the first throttle element 13, the first branch communicates the first node 27 with the second node 28, and the first valve 29 is provided on the first branch. In the refrigeration mode of the air conditioning system, an opening degree of the first valve 29 is adjustable, such that at least a part of refrigerant flowing out of the first end of the first heat exchanger 3 passes through the first valve 29, then passes through the first throttle element 13, and flows into the second heat exchanger 4. As an example, the first valve 29 is an electromagnetic valve and electrically connected to a control device 100 of the air conditioning system. The control device 100 controls the first valve 29 to open/close and the opening degree of the valve based on a suction superheat degree and/or exhaust temperature of the compressor 1.

A second valve 20 is provided on a pipeline between the second end of the second heat exchange portion 62 and the second node 28. In the heating mode of the air conditioning system, the first valve 29 is opened, and the second valve 20 is closed. The second valve 20 can also be an electromagnetic valve and electrically connected to the control device 100, and the control device 100 controls the second valve 20 to open/close. In addition, a first flow regulating device is further provided on the pipeline between the first end of the first heat exchanger 3 and the first end of the second heat exchange portion 62. The first flow regulating device includes a valve unit 11 and a throttle unit 12. In the refrigeration mode, valve unit 11 is turned on, and the throttle unit 12 is turned off; and in the heating mode, the throttle unit 12 is turned on, and the valve unit 11 is at least partially turned off. Specifically, the valve unit 11 can be a two-way valve, a three-way valve, or a one-way valve communicating the first heat exchanger 3 with the first node 27, or can be a flow regulating valve formed in one piece together with the throttle unit 12. The above-mentioned throttle unit 12 and first throttle element 13 both can be an electronic expansion valve, a thermal expansion valve, etc., and the easily controllable electronic expansion valve is adopted in the present embodiment.

Operating principles of different operation modes of the present embodiment will be described as below.

1) In the refrigeration mode, as shown in FIG. 1, the opening degree of the first valve 29 is adjustable, the second valve 20 is opened, the valve unit 11 is turned on, the throttle unit 12 is turned off, the refrigerant flows from the first port of the fluid switching valve 18 to the second port of the fluid switching valve 18, the first throttle element 13 is turned on, and the shut-off valve 35 is closed. The heavy lines in FIG. 1 illustrate two circulation loops of the refrigeration mode in the present embodiment. A first refrigeration circulation loop is: the compressor 1—the third heat exchanger 5—the fluid switching valve 18—the first heat exchanger 3—the valve unit 11—the first valve 29—the first throttle element 13—the second heat exchanger 4—the accumulator 2—the first heat exchange portion 61—the compressor 1; and a second refrigeration circulation loop is: the compressor 1—the third heat exchanger 5—the fluid switching valve 18—the first heat exchanger 3—the valve unit 11—the second heat exchange portion 62—the second valve 20—the first throttle element 13—the second heat exchanger 4—the accumulator 2—the first heat exchange portion 61—the compressor 1. During a refrigeration circulation of the air conditioning system, when the first valve 29 has a certain opening degree, only a part of high-pressure refrigerant flowing out of the first heat exchanger 3 passes through the intermediate heat exchanger 6, which weakens a heat exchange capacity of the intermediate heat exchanger 6, and a temperature of a low-temperature and low-pressure refrigerant flowing out of the second heat exchanger 4 is not increased greatly, such that a suction temperature of the compressor 1 can be effectively controlled, thereby controlling an exhaust temperature of the compressor 1 within an appropriate range while suppressing a significant decrease in a suction mass flow rate of the compressor 1 (under a certain suction pressure, the suction temperature increases, a suction density decreases, and the suction mass flow rate decreases). In such a high-temperature operating condition, in order to quickly cool the cabin of the car, the compressor 1 can operate at a high frequency and a high efficiency, overcoming the limitation that the compressor 1 cannot operate efficiently due to the excessive exhaust temperature. Herein, the opening degree of the first valve 29 can be adjusted by the control device 100 based on the suction/exhaust temperature of the compressor 1, so as to effectively control the suction/exhaust temperature of the compressor 1 by changing a heat exchange capacity of the intermediate heat exchanger 6, thereby fully exerting the capacity of the compressor 1. When an ambient temperature is not particularly high, the compressor 1 is not required to operate at the high frequency, the first valve 29 can be fully closed, the second valve 20 can be fully opened, all the high-pressure refrigerant flowing out of the first heat exchanger 3 flows into the intermediate heat exchanger 6 and cooled, and the intermediate heat exchanger 6 can fully play the role of backheating, thereby exerting the maximum capacity of the intermediate heat exchanger 6. In addition, it is also possible that the first valve 29 is fully opened and the second valve 20 is fully closed, so that all the high-pressure refrigerant flowing out of the first heat exchanger 3 does not pass through the intermediate heat exchanger 6, i.e., the intermediate heat exchanger 6 does not play the role of regenerator.

Figure 2:
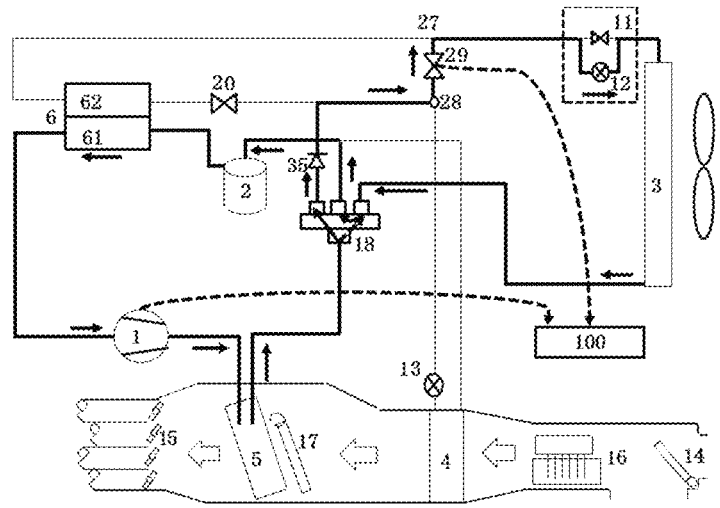
FIG. 2 is a schematic diagram of the air conditioning system in a heating mode according to the first embodiment of the present application.

2) In the heating mode, as shown in FIG. 2, the first valve 29 is opened, the second valve 20 is closed, the valve unit 11 is uncommunicated, the throttle unit 12 is turned on, the refrigerant flows from the first port of the fluid switching valve 18 to the fourth port of the fluid switching valve 18, and meanwhile, the refrigerant flows from the second port of the fluid switching valve 18 to the third port of the fluid switching valve 18, the first throttle element 13 is turned off, and the shut-off valve 35 is opened. As illustrated with the heavy lines in FIG. 2, the heating circulation loop in the present embodiment is: the compressor 1—the third heat exchanger 5—the fluid switching valve 18—the shut-off valve 35—the first valve 29—the throttle unit 12—the first heat exchanger 3—the fluid switching valve 18—the accumulator 2—the first heat exchange portion 61—the compressor 1. In the present embodiment, the indoor air flows through and is heated by the third heat exchanger 5, and then is supplied into the cabin via the air flue and the grid 15 to increase the temperature in the cabin, thereby providing users with a comfortable travel environment. In addition, when the air conditioning system of the present application is applied to heating of an automotive air conditioning system, the refrigerant is prevented from passing through the second heat exchanger 4, such that the air blown by the air blower 16 will directly reach the third heat exchanger 5 having the refrigerant with a relatively high temperature for heat exchange, without undergoing heat exchange when passing through the second heat exchanger 4. If the ambient temperature is too low, and a heat pump has an insufficient heating performance or the heat pump has a low efficiency, such that the heat pump may even fail to work, an electric heater can be used to assist heating, and the electric heater can achieve the heating function together with the air conditioning system. In this way, a working range of the system can be further broadened, thereby expanding an application range of the automotive air conditioner, especially in low-temperature and cold areas.

During a heating circulation of the present application, as there is no or very little heat exchange performed in the intermediate heat exchanger 6, the low-pressure refrigerant from the accumulator 2 will not be heated, effectively reducing the suction superheat degree of the compressor 1. In this way, the system can operate under the high exhaust pressure, and fully exert the capability of air conditioning system.

Figure 3:
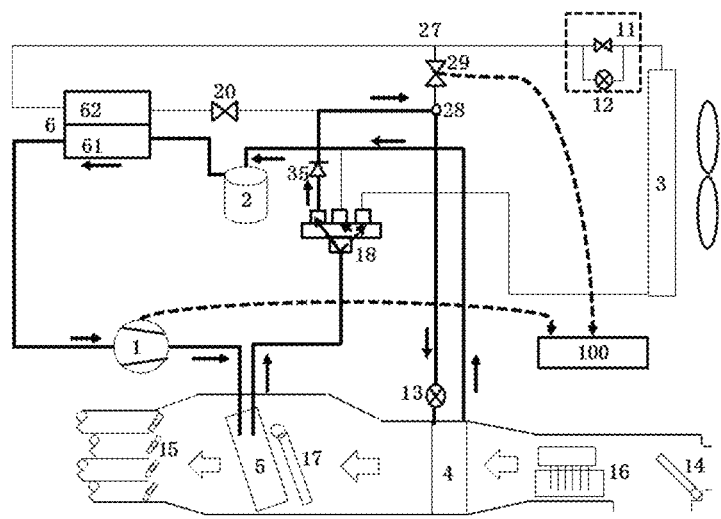
FIG. 3 is a schematic diagram of the air conditioning system in a first dehumidification mode according to the first embodiment of the present application.

3) In the first dehumidification mode, as shown in FIG. 3, the first valve 29 is closed, the second valve 20 is closed, the valve unit 11 is uncommunicated, the throttle unit 12 is turned off, the refrigerant flows from the first port of the fluid switching valve 18 to the fourth port of the fluid switching valve 18, the first throttle element 13 is turned on, the shut-off valve 35 is opened, and a small amount of refrigerant flows between the third port and the second port of the fluid switching valve 18. As illustrated with the heavy lines in FIG. 3, a dehumidification circulation loop of this embodiment is: the compressor 1—the third heat exchanger 5—the fluid switching valve 18—the shut-off valve 35—the first throttle element 13—the second heat exchanger 4—the accumulator 2—the first heat exchange portion 61—the compressor 1. In the circulation, the compressor 1 consumes a certain amount of electrical energy to compress a low-temperature and low-pressure gaseous refrigerant into a high-temperature and high-pressure gaseous refrigerant, which is then supplied to the third heat exchanger 5. At the third heat exchanger 5, the opening degree of the second air door 17 is adjusted to choose whether the refrigerant exchanges heat with the indoor air flow. That is, when the temperature is relatively low, the third heat exchanger 5 exchanges heat with the indoor air flow; and when the temperature is relatively high, the third heat exchanger 5 does not exchange heat with the indoor air flow. The refrigerant flows out of the third heat exchanger 5, passes through the first throttle element 13 to perform throttling and depressurization, and then reaches the second heat exchanger 4, in which the low-temperature and low-pressure liquid refrigerant exchanges heat with the indoor air flow. Since the second heat exchanger 4 has a surface temperature much lower than the temperature in the cabin, during this process, a dew point temperature of the air upstream of the second heat exchanger 4 is higher than the surface temperature of the second heat exchanger 4, so that moisture may be condensed and appear on the surface of the second heat exchanger 4 and then the moisture is discharged through a tube. Thus, the content of water vapor in the air in the cabin, i.e., a relative humidity, can be reduced, so as to achieve the purpose of dehumidification or defogging in the cabin. The refrigerant, after flowing out of the second heat exchanger 4, flows into the accumulator 2, and then the fluid refrigerant is separated and stored in the accumulator 2. The low-temperature and low-pressure gaseous refrigerant reaches the second end of the first heat exchange portion 61 of the intermediate heat exchanger 6. At this time, there is no heat exchange in the intermediate heat exchanger 6, and the refrigerant flows out of the first end of the first heat exchange portion 61, enters the inlet of the compressor 1, and then is compressed by the compressor 1 into a high-temperature and high-pressure gaseous refrigerant. The above is a process of one circulation.

In this embodiment, the indoor air flow is cooled and dehumidified through the second heat exchanger 4, heated to a suitable temperature through the third heat exchanger 5, and then supplied into the cabin through the air flue and grid 15, so as to provide the users with a comfortable travel environment. The temperature control of the indoor air flow is achieved as follows. A ratio of the air flow passing through the third heat exchanger 5 can be determined by an opening angle of the second air door 17 as needed, and the air flow passing through the third heat exchanger 5 is heated, and then mixed with the original air flow until a desired temperature is reached. In addition, if the temperature is relatively high, the opening degree of the second air door 17 of the third heat exchanger 5 can be zero, allowing the air flue to bypass, such that the air is prevented from passing through the third heat exchanger 5. In this way, when the high-temperature and high-pressure gaseous refrigerant flows out of the compressor 1 and passes through the third heat exchanger 5, the second air door 17 is closed, such that the refrigerant passing through the third heat exchanger 5 will not exchange heat with the air flow. When the temperature is relatively low, the opening degree of the second air door 17 of the third heat exchanger 5 can be maximized, allowing the air to pass through the third heat exchanger 5, such that the dehumidified air is heated and then supplied to the interior of the cabin or window through the air flue and grid 15. In this way, the temperature and humidity can be controlled at the same time, thereby improving comfortableness in the cabin. In addition, if it is needed to quickly remove the mist or water vapor on the glass, the second air door 17 can be directly closed, and the cold air is directly blown to the glass through a corresponding air pipe, so as to quickly remove the mist on the glass surface.

Figure 4:
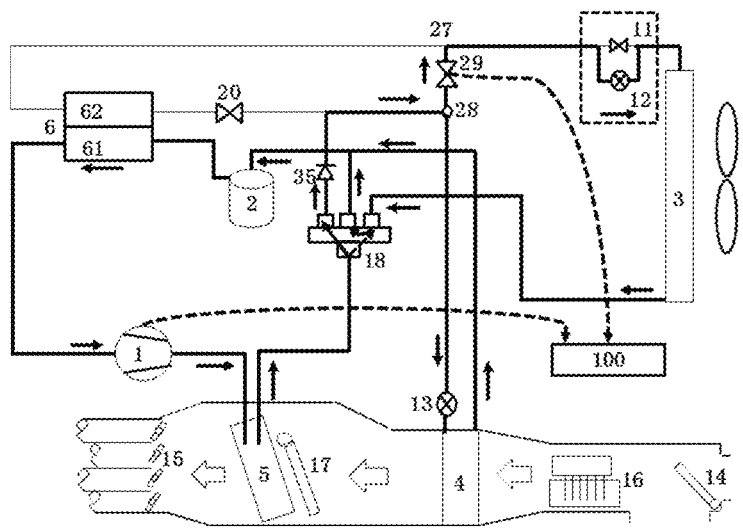
FIG. 4 is a schematic diagram of the air conditioning system in a second dehumidification mode according to the first embodiment of the present application.

4) In the second dehumidification mode, as shown in FIG. 4, the first valve 29 is opened, the second valve 20 is closed, the valve unit 11 is at least partially turned off, the throttle unit 12 is turned on, the refrigerant flows from the first port of the fluid switching valve 18 to the fourth port of the fluid switching valve 18, and meanwhile, the refrigerant flows from the second port of the fluid switching valve 18 to the third port of the fluid switching valve 18, the first throttle element 13 is turned on, and the shut-off valve 35 is in a communicating state. As illustrated with the heavy lines in FIG. 4, the second dehumidification mode has two refrigerant circulation loops. A first refrigerant circulation loop is the same as that in the above-mentioned first dehumidification mode, which will not be repeated herein. A second refrigerant circulation loop is: the compressor 1—the third heat exchanger 5—the fluid switching valve 18—the shut-off valve 35—the first valve 29—the throttle unit 12—the first heat exchanger 3—the fluid switching valve 18—the accumulator 2—the first heat exchange portion 61—the compressor 1.

In this embodiment, in the second refrigerant circulation loop, the throttle unit 12 is provided to increase a temperature difference between the refrigerant reaching the first heat exchanger 3 and the external environment, so that the air conditioning system can absorb heat from the external environment, thereby enhancing energy efficiency. In the meantime, since there is no heat exchange performed in the intermediate heat exchanger 6, the intermediate heat exchanger 6 has no effect, avoiding the influence of the intermediate heat exchanger 6. Compared with the first dehumidification mode, the second dehumidification mode of this embodiment improves the efficiency of the system and avoids the waste of energy, thereby saving electrical energy and improving the mileage of the car. In this embodiment, the indoor air flow is a mixed air flowing through the inner circulation air outlet and the new air outlet, and the mixing ratio can be controlled by the first air door 14 of the system according to the comfort requirements. The introduction of internal circulating air according to the present application can further save power consumption, and a proportion of internal circulating air is selected to avoid misting on the window.

Figure 5:
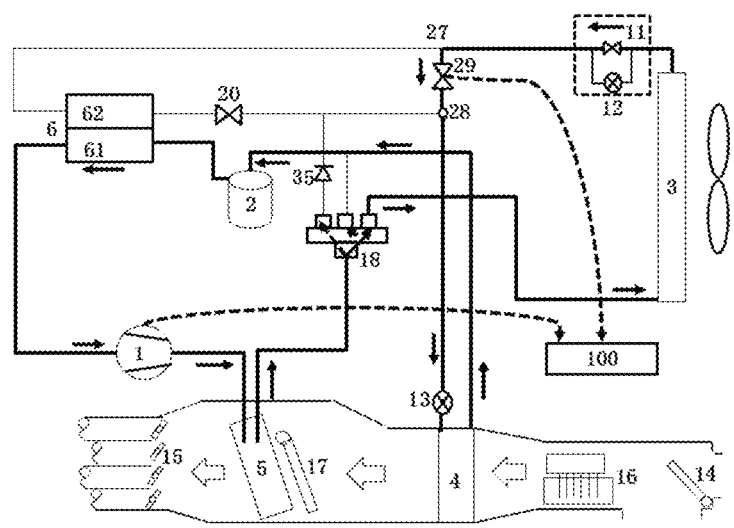
FIG. 5 is a schematic diagram of the air conditioning system in a defrost mode according to the first embodiment of the present application.

5) In the defrost mode, as shown in FIG. 5, the first valve 29 is at least partially opened, the second valve 20 is closed, the valve unit 11 is turned on, the throttle unit 12 is turned off, the refrigerant flows from the first port of the fluid switching valve 18 to the second port of the fluid switching valve 18, the first throttle element 13 is turned on, and the shut-off valve 35 is in a uncommunicating state. As illustrated with the heavy lines in FIG. 5, the defrost circulation loop is: the compressor 1—the third heat exchanger 5—the fluid switching valve 18—the first heat exchanger 3—the valve unit 11—the first valve 29—the first throttle element 13—the second heat exchanger 4—the accumulator 2—the first heat exchange portion 61—the compressor 1.

Second Embodiment

FIG. 9 to FIG. 14 show a first air conditioning system according to this embodiment, in which a first branch is provided between the first end of the first heat exchange portion 61 and the second end of the second heat exchange portion 62. The first branch is provided with a second throttle element 10. When the air conditioning system is in the refrigeration mode, the second throttle element 10 can adjust the opening degree based on the operation condition of the compressor 1. As an example, the second throttle element 10 is an electronic expansion valve and is electrically connected to the control device 100 of the air conditioning system, and the control device 100 controls the second throttle element to open/close and a size of the opening degree of the valve based on the suction superheat degree and/or exhaust temperature of the compressor 1.

A second flow regulating device 7 is provided on the pipeline between the first end of the first heat exchanger 3 and the first end of the second heat exchange portion 62, and the second flow regulating device 7 includes a valve unit 9 and a throttle unit 8. In the refrigeration mode, the valve unit 9 is turned on, the throttle unit 8 is turned off; and in the heating mode, the throttle unit 8 is turned on, and the valve unit 9 is at least partially turned off. Specifically, the valve unit 9 can be a two-way valve, a three-way valve, or a one-way valve communicating the second heat exchange portion 62 with the first throttle valve 13, or can be a flow regulating valve formed in one piece together with the throttle unit 8. The above-mentioned throttle unit 8 and first throttle element 13 both can be an electronic expansion valve, a thermal expansion valve, etc., and the easily controllable electronic expansion valve is adopted in the present embodiment.

Operating principles of different operation modes of the present embodiment will be described as below.

Figure 9:
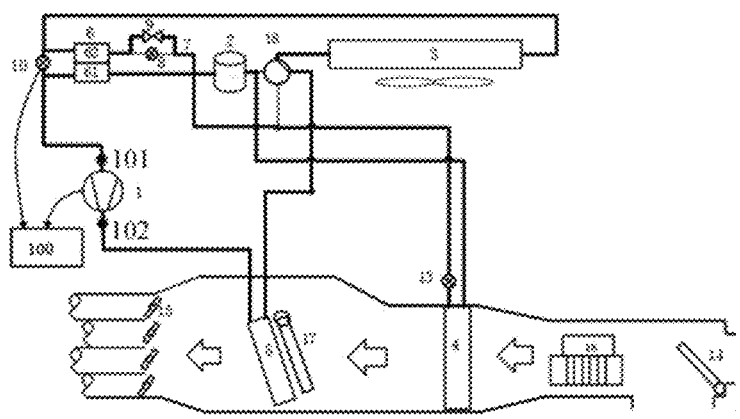
FIG. 9 is a schematic diagram of an air conditioning system in a refrigeration mode according to a second embodiment of the present application.

1) In the refrigeration mode, as shown in FIG. 9, the valve unit 9 is turned on, the throttle unit 8 is turned off, the first throttle element 13 is turned on, the fluid switching valve 18 is in a first operation mode, the second throttle element 10 is turned on or off as needed, and the opening degree is adjustable. As illustrated with the heavy lines in FIG. 9, the refrigeration mode of the present embodiment includes two circulation loops. A first refrigeration circulation loop is: the compressor 1—the third heat exchanger 5—the fluid switching valve 18—the first heat exchanger 3—the second heat exchange portion 62—the valve unit 9—the first throttle element 13—the second heat exchanger 4—the accumulator 2—the first heat exchange portion 61—the compressor 1; and a second refrigeration circulation loop is: the compressor 1—the third heat exchanger 5—the fluid switching valve 18—the first heat exchanger 3—the second throttle element 10—the compressor 1. In the refrigeration circulation of the air conditioning system, when the second throttle element 10 has a certain opening degree, only a part of the high-pressure refrigerant flowing out of the first heat exchanger 3 passes through the intermediate heat exchanger 6, which weakens a heat exchange capacity of the intermediate heat exchanger 6, the low-temperature and low-pressure refrigerant flowing out of the second heat exchanger 4 is added with a part of the low-pressure refrigerant throttled by the second throttle element 10, such that the temperature of the refrigerant will not be greatly increased. Thus, the suction temperature of the compressor 1 can be effectively controlled, allowing the exhaust temperature of the compressor 1 within an appropriate range while suppressing a significant decrease in the suction mass flow rate of the compressor 1 (under the certain suction pressure, the suction temperature increases, the suction density decreases, and the suction mass flow rate decreases). In such a high-temperature operating condition, in order to quickly cool the cabin of the car, the compressor 1 can operate at a high frequency and a high efficiency, overcoming the limitation that the compressor 1 cannot operate efficiently due to the excessive exhaust temperature. Herein, the opening degree of the second throttle element 10 can be adjusted by the control device 100 according to the suction/exhaust temperature of the compressor 1, so as to effectively control the suction/exhaust temperature of the compressor 1 by adjusting an amount of the refrigerant flowing into the second throttle element 10, thereby fully exerting the capacity of the compressor 1. During the refrigeration, the second throttle element 10 can be completely turned off, and in this case, all the high-pressure refrigerant flowing out of the first heat exchanger 3 flows into the intermediate heat exchanger 6 and is cooled, thereby exerting the maximum capacity of the intermediate heat exchanger 6.

Figure 10:
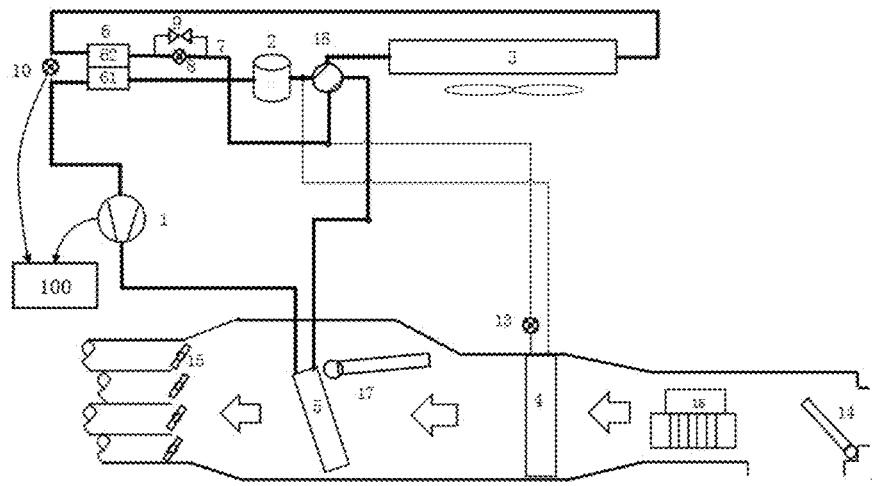
FIG. 10 is a schematic diagram of the air conditioning system in a heating mode according to the second embodiment of the present application.

2) In the heating mode, as shown in FIG. 10, the second throttle element 10 is turned off, the valve unit 9 is uncommunicated, the throttle unit 8 is turned on, the first throttle valve 13 is closed, the fluid switching valve 18 is in a second operation mode, the first port of the fluid switching valve 18 is in communication with the fourth port of the fluid switching valve 18, and meanwhile, the second port of the fluid switching valve 18 is in communication with the third port of the fluid switching valve 13. As illustrated with the heavy lines in FIG. 10, the heating circulation loop of the present embodiment is: the compressor 1—the third heat exchanger 5—the fluid switching valve 18—the throttle unit 8—the second heat exchange portion 62—the first heat exchanger 3—the accumulator 2—the first heat exchange portion 61—the compressor 1. In the present embodiment, the indoor air flows through and is heated by the third heat exchanger 5, and then is supplied into the cabin via the air flue and the grid 15 to increase the temperature in the cabin, thereby providing users with a comfortable travel environment. In addition, when the air conditioning system of the present application is applied to heating of an automotive air conditioning system, the refrigerant is prevented from passing through the second heat exchanger 4, such that the air blown by the air blower 16 will directly reach the third heat exchanger 5 having the refrigerant with a relatively high temperature for heat exchange, without undergoing heat exchange when passing through the second heat exchanger 4. If the ambient temperature is too low, and a heat pump has an insufficient heating performance, leading to that the heat pump has a low efficiency or even the heat pump cannot work, an electric heater can be used to assist heating, and the electric heater can achieve the heating function together with the air conditioning system. In this way, a working range of the system can be further broadened, thereby expanding an application range of the automotive air conditioner, especially in low-temperature and cold areas.

During the heating circulation of the present application, since the high-pressure refrigerant flowing out of the third heat exchanger 5 first passes through the throttle unit 8 to be throttled and depressurized, the temperature thereof is relatively low, and thus a temperature difference between the refrigerant flowing through the second heat exchange portion 62 and the refrigerant flowing through the first heat exchange portion 61 is reduced, thereby greatly weakening the heat exchange function of the intermediate heat exchanger 6. Further, in such an operation condition, the refrigerant in the first heat exchange portion 61 and the refrigerant in the second heat exchange portion 62 exchange heat in a down-stream manner, thereby further reducing the heat exchange effect of the intermediate heat exchanger 6 and effectively reducing the suction superheat degree of the compressor 1 in the heating mode.

Figure 11:
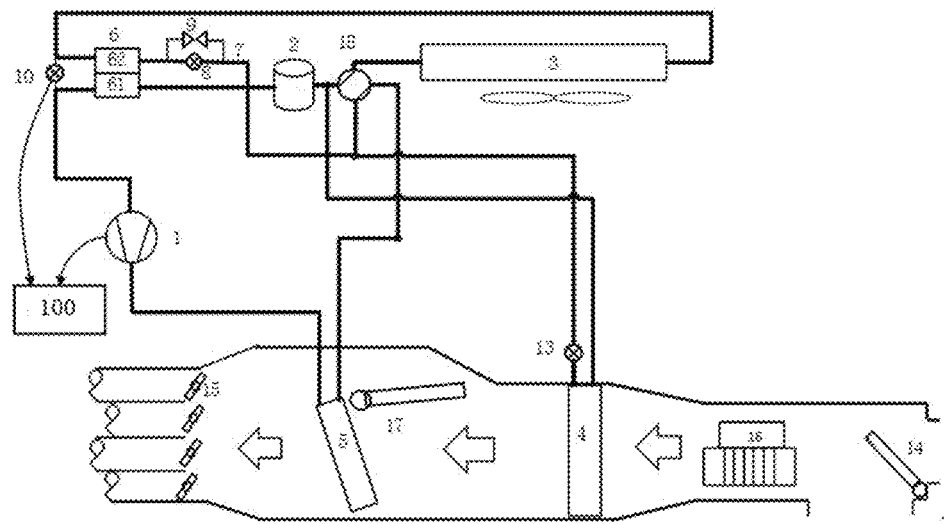
FIG. 11 is a schematic diagram of the air conditioning system in a first dehumidification mode according to the second embodiment of the present application.

3) In the first dehumidification mode, as shown in FIG. 11, the second throttle element 10 is turned off, the first throttle element 13 is turned on, the throttle unit 8 is turned on, the valve unit 9 is at least partially turned off, the fluid switching valve 18 is in a second operation mode, the first port of the fluid switching valve 18 is in communication with the fourth port of the fluid switching valve 18, and the second port of the fluid switching valve 18 is in communication with the third port of the fluid switching valve 18. As illustrated by the heavy lines in FIG. 11, the dehumidification circulation loops of the present embodiment include two circulation loops. A first dehumidification circulation loop is: the compressor 1—the third heat exchanger 5—the fluid switching valve 18—the first throttle element 13—the second heat exchanger 4—the accumulator 2—the first heat exchange portion 61—the compressor 1. A second dehumidification circulation loop is: the compressor 1—the third heat exchanger 5—the fluid switching valve 18—the throttle unit 8—the second heat exchange portion 62—the first heat exchanger 3—the accumulator 2—the first heat exchange portion 61—the compressor 1. In the circulation, the compressor 1 consumes a certain amount of electrical energy to compress a low-temperature and low-pressure gaseous refrigerant into a high-temperature and high-pressure gaseous refrigerant, which is then supplied to the third heat exchanger 5. At the third heat exchanger 5, the opening degree of the second air door 17 is adjusted to choose whether the refrigerant exchanges heat with the indoor air flow. That is, when the temperature is relatively low, the third heat exchanger 5 exchanges heat with the indoor air flow; and when the temperature is relatively high, the third heat exchanger 5 does not exchange heat with the indoor air flow. At least a part of the refrigerant flows out of the third heat exchanger 5, passes through the first throttle element 13 to perform throttling and depressurization, and then reaches the second heat exchanger 4, in which the low-temperature and low-pressure liquid refrigerant exchanges heat with the indoor air flow. Since the second heat exchanger 4 has a surface temperature much lower than the temperature in the cabin, during this process, a dew point temperature of the air upstream of the second heat exchanger 4 is higher than the surface temperature of the second heat exchanger 4, so that moisture may be condensed and appear on the surface of the second heat exchanger 4 and then the moisture is discharged through the tube. Thus, the content of water vapor in the air in the cabin, i.e., a relative humidity, can be reduced, so as to achieve the purpose of dehumidification or defogging in the cabin. The refrigerant, after flowing out of the second heat exchanger 4, flows into the accumulator 2, and then the fluid refrigerant is separated and stored in the accumulator 2. The low-temperature and low-pressure gaseous refrigerant reaches the second end of the first heat exchange portion 61 of the intermediate heat exchanger 6. A part of the refrigerant flowing out of the third heat exchanger 5 can also pass through the throttle unit 8 to be throttled and depressurized, then flows into the second heat exchanger 62 and exchanges heat with the refrigerant flowing into the first heat exchanger 61, and then flows into the first heat exchanger 3. The low-temperature and low-pressure liquid refrigerant exchanges heat with the surrounding air in the first heat exchanger 3, then converges with the refrigerant flowing out of the second heat exchanger 4 to flow into the first heat exchange portion 61, exchanges heat with the refrigerant in the second heat exchange portion 62 after being throttled and cooled through the throttle unit 8, and finally flows into the compressor 1.

In this embodiment, the indoor air flow is cooled and dehumidified through the second heat exchanger 4, is heated to a suitable temperature through the third heat exchanger 5, and then is supplied into the cabin through the air flue and grid 15, so as to provide users with a comfortable travel environment. The temperature control of the indoor air flow is achieved as follows. A ratio of the air flow passing through the third heat exchanger 5 can be determined by an opening angle of the second air door 17 as needed, and the air flow passing through the third heat exchanger 5 is heated, and then mixed with the original air flow until a desired temperature is reached. In addition, if the temperature is relatively high, the opening degree of the second air door 17 of the third heat exchanger 5 can be zero, allowing the air flue to bypass, such that the air is prevented from passing through the third heat exchanger 5. In this way, when the high-temperature and high-pressure gaseous refrigerant flows out of the compressor 1 and passes through the third heat exchanger 5, the second air door 17 is closed, such that the refrigerant passing through the third heat exchanger 5 will not exchange heat with the air flow. When the temperature is relatively low, the opening degree of the second air door 17 of the third heat exchanger 5 can be maximized, allowing the air to pass through the third heat exchanger 5, such that the dehumidified air is heated and then supplied to the interior of the cabin or window through the air flue and grid 15. In this way, the temperature and humidity can be controlled at the same time, thereby improving comfortableness in the cabin. In addition, if it is needed to quickly remove the mist or water vapor on the glass, the second air door 17 can be directly closed, and the cold air is directly blown to the glass through a corresponding air pipe, so as to quickly remove the mist on the glass surface.

Figure 12:
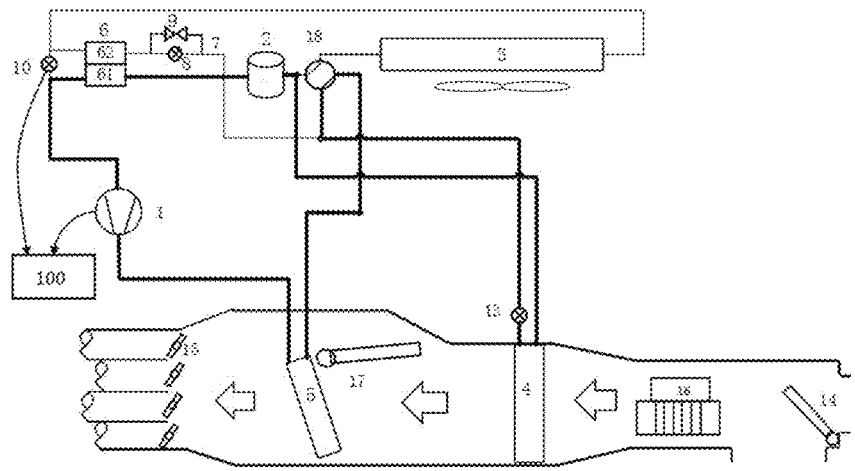
FIG. 12 is a schematic diagram of the air conditioning system in a second dehumidification mode according to the second embodiment of the present application.

4) In the second dehumidification mode, as shown in FIG. 12, the first throttle element 13 is turned on, the second throttle element 10 is turned off, the valve unit 9 is at least partially turned off, the throttle unit 8 is turned off, and the fluid switching valve 18 is in the second operation mode. As illustrated with the heavy lines in FIG. 12, the refrigerant circulation loop of the second dehumidification mode is the same as the above-mentioned first dehumidification loop of the first dehumidification mode, which will not be repeated herein.

Figure 13:
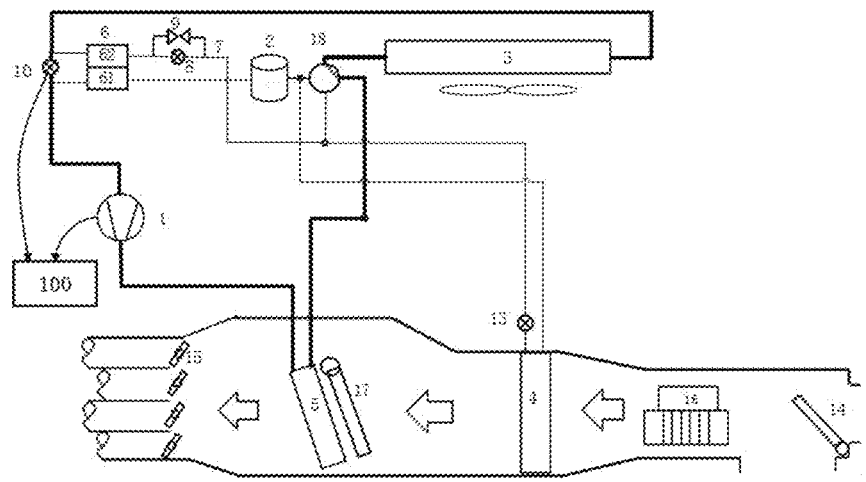
FIG. 13 is a schematic diagram of the air conditioning system in a first defrost mode according to the second embodiment of the present application.

5) In the first defrost mode, as shown in FIG. 13, the first throttle element 13 is turned off, the second throttle element 10 is turned on, the valve unit 9 is uncommunicated, the throttle unit 8 is turned off, and the fluid switching valve 18 is in a first operation mode. As illustrated with the heavy lines in FIG. 13, the defrost circulation loop is: the compressor 1—the third heat exchanger 5—the fluid switching valve 18—the first heat exchanger 3—the second throttle element 10—the compressor 1. In the circulation, the compressor 1 consumes a certain amount of electrical energy to compress a low-temperature and low-pressure gaseous refrigerant into a high-temperature and high-pressure gaseous refrigerant, which is then supplied to the third heat exchanger 5. As an example, at the third heat exchanger 5, the second air door 17 is closed, and the refrigerant passing through the third heat exchanger 5 does not exchange heat with the air flow, the high-pressure refrigerant flowing out of the third heat exchanger 5 flows into the first heat exchanger 3 via the fluid switching valve 18 and exchanges heat with air or a frost layer attached on the surface of the first heat exchanger 3 to achieve defrosting, and then the high-pressure refrigerant flowing out of the first heat exchanger 3 flows into the compressor 1 after being throttled and depressurized by the second throttle element 10. Certainly, at the third heat exchanger 5, the second air door 17 has a certain opening degree. It can be understood that the air blower 16 can be closed at this time, and thus there is no air flow in a conditioning cabinet. The refrigerant of the third heat exchanger 5 generally does not perform heat exchange, so the opening degree of the second air door 17 is unlimited.

Figure 14:
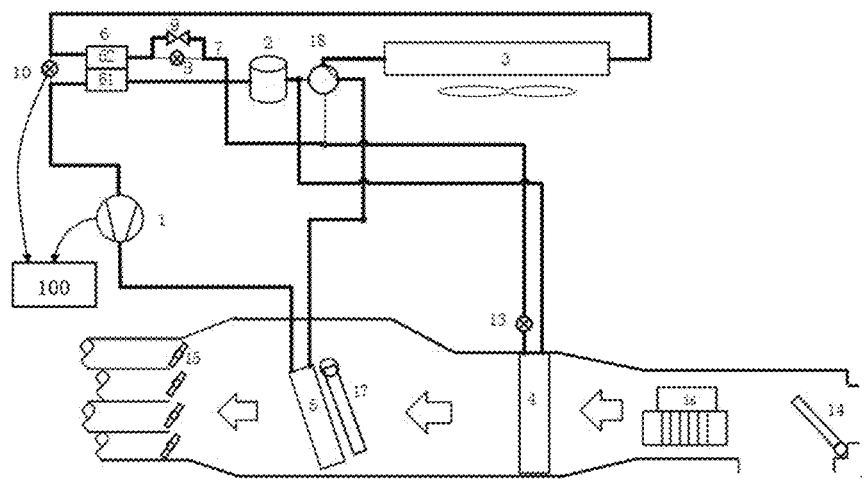
FIG. 14 is a schematic diagram of the air conditioning system in a second defrost mode according to the second embodiment of the present application.

6) In the second defrost mode, as shown in FIG. 14, the valve unit 9 is turned on, the throttle unit 8 is turned off, the first throttle element 13 is turned on, the second throttle element 10 is turned off, and the fluid switching valve 18 is in the first operation mode. As illustrated with the heavy lines in FIG. 14, the defrost circulation loop is: the compressor 1—the third heat exchanger 5—the fluid switching valve 18—the first heat exchanger 3—the second heat exchange portion 62—the valve unit 9—the first throttle element 13—the second heat exchanger 4—the accumulator 2—the first heat exchange portion 61—the compressor 1. In the circulation, the air blower 16 is turned on, the second air door 17 has a certain opening degree, the air flow releases heat at the second heat exchanger 4 and exchanges heat to a certain extent at the third heat exchanger 5, and then is supplied into the cabin through the air flue and grid 15, thereby properly improving the comfortableness in the cabin. In the circulation, the high-temperature and high-pressure refrigerant from the compressor 1 losses some heat after passing through the third heat exchanger 5 and then flows into the first heat exchanger 3 via the fluid switching valve 18, and the high-temperature refrigerant exchanges heat with a frost layer on the surface of the first heat exchanger 3 to achieve defrosting. The high-pressure refrigerant flowing out of the first heat exchanger 3, after being throttled and depressurized by the second heat exchange portion 62 and the first throttle element 13, flows into the second heat exchanger 4 to absorb heat, then flows into the first heat exchanger 61 for heat exchange, and finally flows into the compressor 1.

Figure 15:
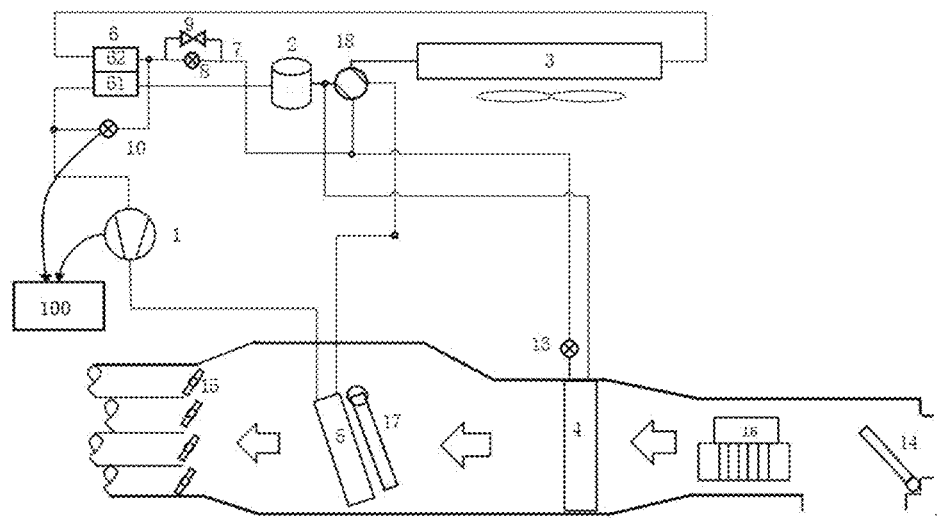
FIG. 15 is a schematic diagram of another structure of the air conditioning system according to the second embodiment of the present application.

FIG. 15 illustrates a second air conditioning system of the present embodiment, which is basically the same as the first air conditioning system of the present embodiment in terms of the composition structure and operating principles, and the difference lies in that one end of the first branch is connected to the first end of the first heat exchange portion 61, and the other end is connected to the second end of the second heat exchange portion 62.

Operating principles of different operation modes of the present embodiment will be described as below.

1) The refrigeration mode includes two circulation loops. A first refrigeration circulation loop is the same as the first refrigeration circulation loop in the first embodiment, which will not be repeated herein. A second refrigeration circulation loop is: the compressor 1—the third heat exchanger 5—the fluid switching valve 18—the first heat exchanger 3—the second heat exchange portion 62—the second throttle element 10—the compressor 1. In the refrigeration circulation of the air conditioning system, when the second throttle element 10 has a certain opening degree, a part of the high-temperature and high-pressure refrigerant flowing out of the second end of the second heat exchange portion 62 flows into the compressor 1 after being throttled and depressurized through the second throttle element 10, so as to reduce the suction temperature of the compressor, such that the exhaust temperature of the compressor 1 is in the proper range. Thus, in the high temperature operating condition, in order to quickly cool the cabin of the car, the compressor 1 can operate at a high frequency and a high efficiency, overcoming the limitation that the compressor 1 cannot operate efficiently due to the excessive exhaust temperature.

2) In the first defrost mode, the first throttle element 13 is turned off, the second throttle element 10 is turned on, the valve unit 9 is uncommunicated, the throttle unit 8 is turned off, and the fluid switching valve 18 is in the first operation mode. The defrost circulation loop is: the compressor 1—the third heat exchanger 5—the fluid switching valve 18—the first heat exchanger 3—the second heat exchange portion 62—the second throttle element 10—the compressor 1. In the circulation, the compressor 1 consumes a certain amount of electrical energy to compress a low-temperature and low-pressure gaseous refrigerant into a high-temperature and high-pressure gaseous refrigerant, which is then supplied to the third heat exchanger 5. As an example, at the third heat exchanger 5, the second air door 17 is turned off, the refrigerant passing through the third heat exchanger 5 does not exchange heat with the air flow, the high-pressure refrigerant flowing out of the third heat exchanger 5 flows into the first heat exchanger 3 via the fluid switching valve 18 and exchanges heat with the surrounding air or a frost layer attached on the surface of the first heat exchanger 3 to achieve defrosting, and then the high-pressure refrigerant flowing out of the first heat exchanger 3 flows into the compressor 1 after being throttled and depressurized by the second throttle element 10. Certainly, at the third heat exchanger 5, the second air door 17 has a certain opening degree. It can be understood that the air blower 16 can be closed at this time, and thus there is no air flow in a conditioning cabinet. The refrigerant of the third heat exchanger 5 generally does not perform heat exchange, so the opening degree of the second air door 17 is unlimited.

3) The heating mode, the first dehumidification mode, the second dehumidification mode and the second defrost mode have the same operating principles as the first air conditioning system, which will not be repeated herein.

Figure 16:
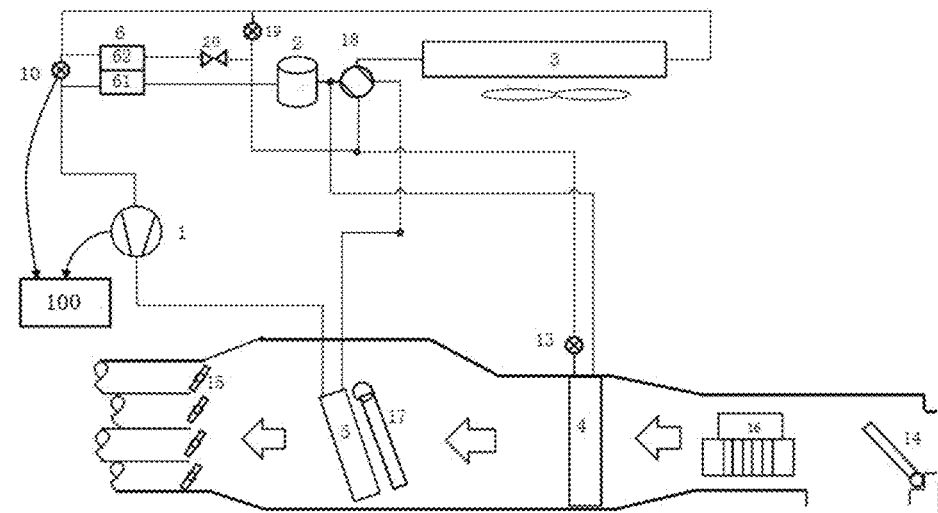
FIG. 16 is a schematic diagram of yet another structure of the air conditioning system according to the second embodiment of the present application.

FIG. 16 illustrates a third air conditioning system of the present embodiment, which is basically the same as the first air conditioning system of the present embodiment in terms of the composition structure and operating principles, and the difference lies in that: the air conditioning system further includes a third branch and a fourth branch, the third branch is provided with a third throttle element 19, the fourth branch includes a second valve 20 and a second heat exchange portion 62, the third branch and the fourth branch are connected in parallel, the outlet of the third heat exchanger 5 is communicable with the first end of the first heat exchanger 3 via the third branch, and the first end of the first heat exchanger 3 is communicable with the inlet of the second heat exchanger 4 via the fourth branch. The second valve 20 can be an electromagnetic valve or a one-way valve. If the second valve 20 is a one-way valve, a passage from the second end of the second heat exchange portion 62 to the first throttle element 13 or the third throttle element 19 is communicated, and it is uncommunicated in an opposite direction. The first branch where the second throttle element 10 is located communicates the first port of the first heat exchange portion 61 with the first port of the second heat exchange portion 62.

Operating principles of different operation modes of the present embodiment will be described as below.

1) In the refrigeration mode, the first throttle element 13 is turned on, the third throttle element 19 is turned on, the fluid switching valve 18 is in the second operation mode, the second throttle element 10 is turned on or off as needed and has an adjustable opening degree, and the second valve 20 is communicated, such that the fourth branch from the second end of the second heat exchange portion 62 to the first throttle element 13 is communicated. The refrigeration mode of the present embodiment includes two circulation loops. A first refrigeration circulation loop is: the compressor 1—the third heat exchanger 5—the fluid switching valve 18—the first heat exchanger 3—the second heat exchange portion 62—the second valve 20—the first throttle element 13—the second heat exchanger 4—the accumulator 2—the first heat exchange portion 61—the compressor 1; and a second refrigeration circulation loop is the same as the second refrigeration circulation loop of the first embodiment, which will not be repeated herein.

2) In the heating mode, the second throttle element 10 is turned off, the second valve 20 is uncommunicated, the first throttle element 13 is turned off, the third throttle element 19 is turned on, and the fluid switching valve 18 is in the second operation mode. The heating circulation loop of the present embodiment is: the compressor 1—the third heat exchanger 5—the fluid switching valve 18—the third throttle element 19—the first heat exchanger 3—the fluid switching valve 18—the accumulator 2—the first heat exchange portion 61—the compressor 1.

During the heating circulation of the present application, as the second valve 20 is uncommunicated, no flowing refrigerant enters the second heat exchange portion 62. Thus, the intermediate heat exchanger 6 does not has an effect of backheating, thereby effectively reducing the suction superheat degree of the compressor 1 in the heating mode.

3) The first dehumidification mode includes two circulation loops. A first dehumidification circulation loop is the same as the first dehumidification circulation loop of the first embodiment, which will not be described in detail herein, and a second dehumidification circulation loop is: the compressor 1—the third heat exchanger 5—the fluid switching valve 18—the third throttle element 19—the first heat exchanger 3—the fluid switching valve 18—the accumulator 2—the first heat exchange portion 61—the compressor 1. In the circulation, a part of the refrigerant flowing out of the third heat exchanger 5 can be throttled and depressurized by the third throttle element 19, the low-temperature and low-pressure liquid refrigerant, after exchanging heat with the surrounding air in the first heat exchanger 3, converges with the refrigerant flowing out of the second heat exchanger 4 to flow into the first heat exchange portion 61, and then flows into the compressor 1. As the second valve 20 is uncommunicated, there is no flowing refrigerant in the second heat exchange portion 62. Thus, the intermediate heat exchanger 6 does not has the effect of backheating in this case.

4) The second dehumidification mode is basically the same as the first air conditioning system of the present embodiment, which will not be described in detail herein.

5) In the first defrost mode, the first throttle element 13 is turned off, the second throttle element 10 is turned on, the third throttle element 19 is turned off, the second valve 20 is uncommunicated, and the fluid switching valve 18 is in the first operation mode. The defrost circulation loop is the same as the first defrost mode of the first air conditioning system of the present embodiment, which will not be repeated herein.

Certainly, in the present embodiment, the first branch where the second throttle element 10 is located communicates the first port of the first heat exchange portion 61 with the second port of the second heat exchange portion 62, which also falls within the protection scope of the present application. Reference may be made to the second air conditioning system in this embodiment for the operating principle, which will not be repeated herein.

Third Embodiment

As shown in FIGS. 17-21, a first air conditioning system provided by this embodiment includes a first branch connected in parallel with the first heat exchange portion 61, and the first branch is provided with a third valve 30. It can be understood that the third valve 30 can be a two-way valve having an adjustable opening degree; or the first heat exchange portion 61 is in communication with the first branch via the third valve 30. Specifically, the third valve 30 includes a first port, a second port, and a third port, the third port of the third valve 30 is in communication with the first end of the first heat exchange portion 61, the first port of the third valve 30 is in communication with the first branch, and the second port of the third valve 30 is in communication with the inlet of the compressor 1. As an example, in this case, the third valve 30 is an electromagnetic three-way valve, the refrigerant is divided into two paths after flowing through the accumulator 2, one of them flows towards the first branch, and the other one flows towards the first heat exchange portion 61. One part of the refrigerant passing through the first branch flows towards the third valve 30, and the other part of the refrigerant converges with the refrigerant passing through the first heat exchange portion 61 at the first end of the first heat exchange portion 61 and together flow towards the third valve 30. All the refrigerant flow towards the compressor 1 after passing through the third valve 30. In another implementation manner, the third port of the third valve 30 is in communication with the second end of the first heat exchange portion 61, the first port of the third valve 30 is in communication with the first branch, and the second port of the third valve 30 is in communication with the outlet of the accumulator 2. For example, the third valve 30 may be an electromagnetic three-way valve, the refrigerant is divided into two paths after flowing through the second heat exchange portion 62, one of them flows towards the second heat exchanger 4, and the other one flows towards the third valve 30. One part of the refrigerant passing through the accumulator 2 flows towards the third valve 30, and the other part of the refrigerant flows towards the first heat exchange portion 61. Two paths of the refrigerant passing through the third valve 30 flow towards the first branch, the refrigerant passing through the first branch converges with the refrigerant passing through the first heat exchange portion 61 and together flow towards the third valve 30, and all the refrigerant flow towards the compressor 1.

Figure 30:
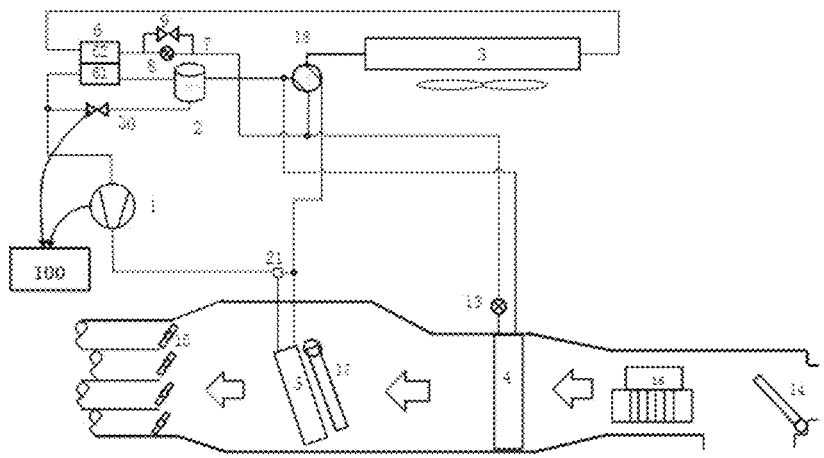
FIG. 30 is a schematic diagram of yet another structure of the air conditioning system according to the fourth embodiment of the present application.
Figure 31:
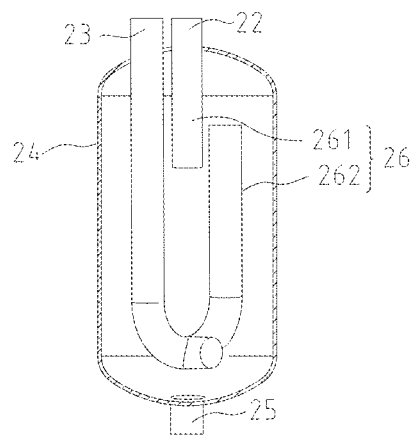
FIG. 31 is a structural schematic diagram of an accumulator of the air conditioning system according to the fourth embodiment of the present application.

The first branch is connected in parallel with the first heat exchange portion 61, and the first branch is provided with a third valve 30, or the first heat exchange portion 61 is in communication with the first branch via the third valve 30. When the air conditioning system is in the refrigeration mode, the opening degree of the third valve 3 can be adjusted according to the operation condition of the compressor 1. As an example, the third valve 30 is an electronic expansion valve and is electrically connected to the control device 100 of the air conditioning system, and the control device 100 controls the third valve 30 to open/close and a size of the opening degree of the valve according to the suction superheat degree and/or exhaust temperature of the compressor 1. It can be understood that, the outlet of the compressor 1 and the first port of the fluid switching valve 18 can be connected through a section of a pipeline. That is, the third heat exchanger 5 and a fifth branch are connected in parallel, i.e., a three-way valve 21 is provided on the pipeline communicating the outlet of the compressor 1 with the inlet of the third heat exchanger 5. Referring to FIG. 30, the three-way valve 21 includes a first port, a second port, and a third port, the first port of the three-way valve 21 is in communication with the outlet of the compressor 1, the second port of the three-way valve 21 is in communication with the inlet of the third heat exchanger 5, the third port of the three-way valve 21 is in communication with the fifth branch, such that the third port of the three-way valve 21 is communicable with the outlet of the third heat exchanger 5 and/or the first port of the fluid switching valve 18. For example, the three-way valve 21 may be an electromagnetic three-way valve.

A second flow regulating device 7 is provided on the pipeline between the second end of the second heat exchange portion 62 and the outlet of the third heat exchanger 5 or the second heat exchanger 4, and the second flow regulating device 7 includes a valve unit 9 and a throttle unit 8. In the refrigeration mode, the valve unit 9 is turned on, the throttle unit 8 is turned off; and in the heating mode, the throttle unit 8 is turned on, and the valve unit 9 is at least partially turned off. Specifically, the valve unit 9 can be a two-way valve, a three-way valve, or a one-way valve communicating the second heat exchange portion 62 with the first throttle valve 13, or can be a flow regulating valve formed in one piece together with the throttle unit 8. The above-mentioned throttle unit 8 and first throttle element 13 both can be an electronic expansion valve, a thermal expansion valve, etc., and the easily controllable electronic expansion valve is adopted in the present embodiment.

Operating principles of different operation modes of the present embodiment will be described as below.

Figure 17:
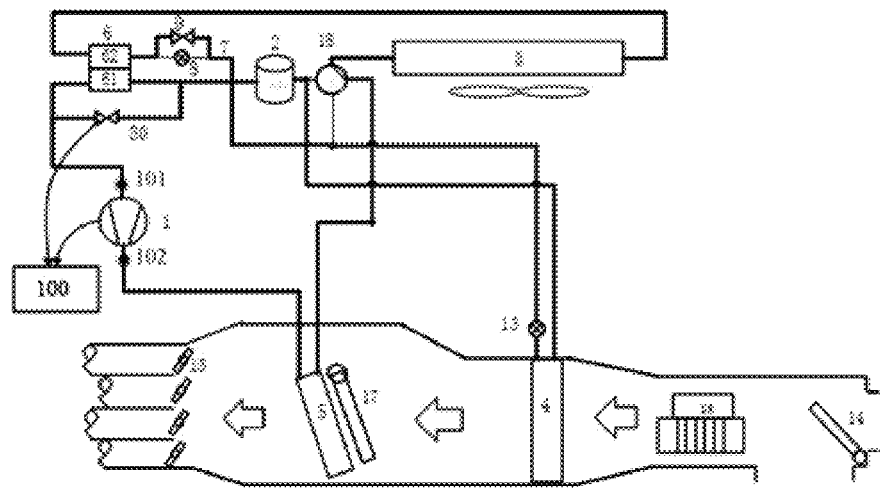
FIG. 17 is a schematic diagram of an air conditioning system in a refrigeration mode according to a third embodiment of the present application.

1) In the refrigeration mode, as shown in FIG. 17, the valve unit 9 is turned on, the throttle unit 8 is turned off, the first throttle element 13 is turned on, the fluid switching valve 18 is in the first operation mode, and the opening degree of the third valve 30 is adjusted as needed. As illustrated with the heavy lines in FIG. 17, the refrigeration mode of the present embodiment includes two circulation loops. A first refrigeration circulation loop is: the compressor 1—the third heat exchanger 5—the fluid switching valve 18—the first heat exchanger 3—the second heat exchange portion 62—the valve unit 9—the first throttle element 13—the second heat exchanger 4—the accumulator 2—the first heat exchange portion 61—the compressor 1. A second refrigeration circulation loop is: the compressor 1—the third heat exchanger 5—the fluid switching valve 18—the first heat exchanger 3—the second heat exchange portion 62—the valve unit 9—the first throttle element 13—the second heat exchanger 4—the accumulator 2—the third valve 30—the compressor 1. Taking CO2 refrigerant as an example, when the evaporation temperature is 0° C., the suction temperature can be gradually increased from 5° C. to 25° C., the suction density gradually decreases; and when the compressor operates for a certain time and the decrease of the refrigerant density is relatively great, the suction mass flow rate also decreases, resulting in a limited performance of the system. In the refrigeration circulation of the air conditioning system, when the third valve 30 has a certain opening degree, only a part of the refrigerant having relatively low temperature and flowing out of the second heat exchanger 4 passes through the intermediate heat exchanger 6, which weakens the heat exchange capacity of the intermediate heat exchanger 6. Thus, the suction temperature of the compressor 1 can be effectively controlled, allowing the exhaust temperature of the compressor 1 within an appropriate range while suppressing a significant decrease in the suction mass flow rate of the compressor 1 (under the certain suction pressure, the suction temperature increases, the suction density decreases, and the suction mass flow rate decreases). In such a high-temperature operating condition, in order to quickly cool the cabin of the car, the compressor 1 can operate at a high frequency and a high efficiency, overcoming the limitation that the compressor 1 cannot operate efficiently due to the excessive exhaust temperature. Herein, the opening degree of the third valve 30 can be adjusted by the control device 100 according to the suction/exhaust temperature of the compressor 1, such that the suction/exhaust temperature of the compressor 1 can be effectively controlled by adjusting an amount of the refrigerant flowing into the third valve 30, thereby fully exerting the capacity of the compressor 1. Certainly, during the refrigeration, the third valve 30 can be completely closed, and in this case, all the refrigerant having relatively low temperature and flowing out of the second heat exchanger 4 flows into the intermediate heat exchanger 6 to perform heat exchange and increase temperature, exerting the maximum capacity of the intermediate heat exchanger 6.

In some air conditioning systems, the intermediate heat exchanger 6 exerts its maximum capacity under both the refrigeration and heating operating conditions. Due to the heat exchange effect of the intermediate heat exchanger 6, the superheat of the low-pressure gas at the suction port of the compressor 1 may go beyond a certain range, which can cause a decrease of the suction mass flow rate and an over-high exhaust temperature, thereby affecting a lubricating effect of a lubricant and reducing a efficiency of a motor. Accordingly, an energy efficiency of the air conditioning system will be reduced. In order to ensure that the compressor operates in a higher operating range, the exhaust temperature of the compressor cannot be too high. Thus, in some operating conditions, the use of the intermediate heat exchanger 6 will limit the operating range of the compressor 1 to a certain extent, which is detrimental to the performance of the system. For example, in the heating mode at a very low temperature, in order to absorb heat at the low ambient temperature, the evaporation pressure of the system is relatively low, and the pressure ratio of the compressor is relatively great. In order to ensure that the exhaust temperature of the compressor does not go beyond the preset range, the exhaust pressure of the compressor is limited, and thus the system's capabilities are also limited.

Figure 18:
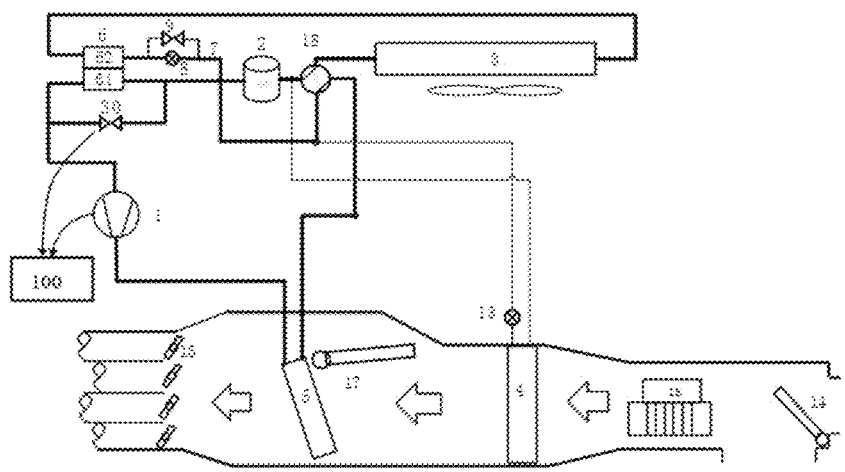
FIG. 18 is a schematic diagram of the air conditioning system in a heating mode according to the third embodiment of the present application.

2) In the heating mode, as shown in FIG. 18, the valve unit 9 is uncommunicated, the throttle unit 8 is turned on, the first throttle valve 13 is closed, the third valve 30 is turned on or communicates with the first branch, the fluid switching valve 18 is in the second operation mode, the first port of the fluid switching valve 18 is in communication with the fourth port of the fluid switching valve 18, and meanwhile, the second port of the fluid switching valve 18 is in communication with the third port of the fluid switching valve 18. As illustrated with the heavy lines in FIG. 18, the heating circulation loop of the present embodiment is: the compressor 1—the third heat exchanger 5—the fluid switching valve 18—the throttle unit 8—the second heat exchange portion 62—the first heat exchanger 3—the accumulator 2—the first heat exchange portion 61—the compressor 1, or the compressor 1—the third heat exchanger 5—the fluid switching valve 18—the throttle unit 8—the second heat exchange portion 62—the first heat exchanger 3—the accumulator 2—the third valve 30—the compressor 1. In the present embodiment, the indoor air flows through and is heated by the third heat exchanger 5, and is supplied into the cabin via the air flue and the grid 15 to increase the temperature in the cabin, thereby providing users with a comfortable travel environment. In addition, when the air conditioning system of the present application is applied to heating of an automotive air conditioning system, the refrigerant is prevented from passing through the second heat exchanger 4, such that the air blown by the air blower 16 will directly reach the third heat exchanger 5 having the refrigerant with a relatively high temperature for heat exchange, without undergoing heat exchange when passing through the second heat exchanger 4. If the ambient temperature is too low, a heat pump has an insufficient heating performance, leading to that the heat pump has a low efficiency or even the heat pump cannot work. In this case, an electric heater can be used to assist heating, and the electric heater can achieve the heating function together with the air conditioning system.

In this way, a working range of the system can be further broadened, thereby expanding an application range of the automotive air conditioner, especially in low-temperature and cold areas.

During the heating circulation of the present application, since the high-pressure refrigerant flowing out of third heat exchanger 5 flows into the second heat exchange portion 62 after being throttled and depressurized through the throttle unit 8, the temperature thereof is relatively low after the cooling, and thus a temperature difference between the refrigerant flowing through the second heat exchange portion 62 and the refrigerant flowing through the first heat exchange portion 61 is reduced, thereby greatly weakening the heat exchange function of the intermediate heat exchanger 6. Further, in such an operation condition, the refrigerant in the first heat exchange portion 61 and the refrigerant in the second heat exchange portion 62 exchange heat in a down-stream manner, thereby further reducing the heat exchange effect of the intermediate heat exchanger 6 and effectively reducing the suction superheat degree of the compressor 1 in the heating mode.

Figure 32:
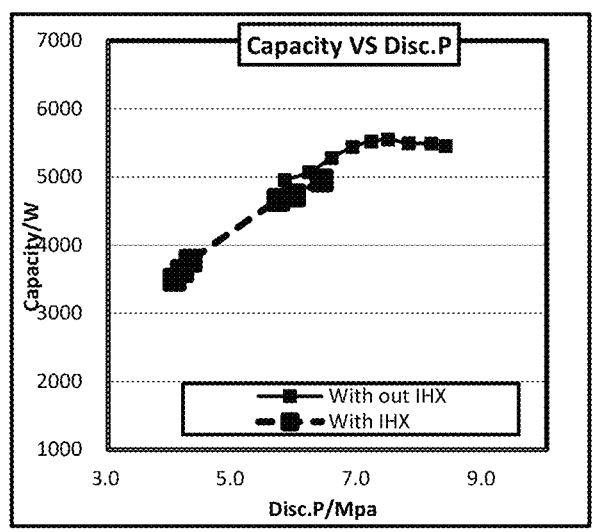
FIG. 32 and FIG. 33 are data comparison diagrams of a heating capacity of an air conditioning system under very low temperature conditions according to an embodiment of the present application.
Figure 33:
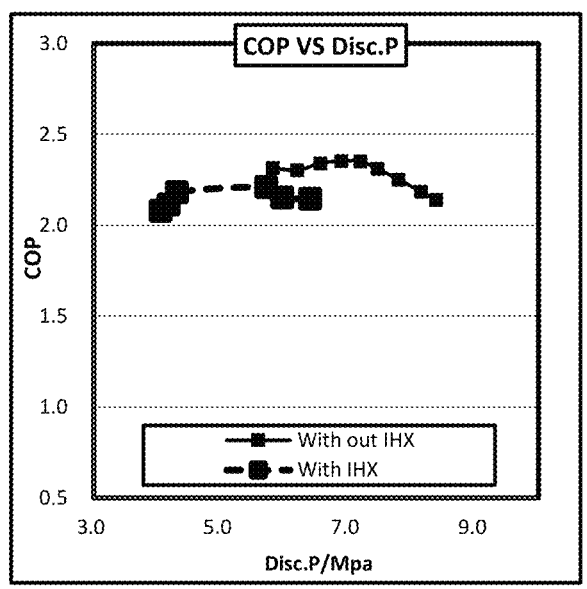

Referring to FIG. 32 and FIG. 33, under a very low temperature (−20° C.) operating condition, the air conditioning system adopts $CO_2$ as the refrigerant, and in the heating mode, the heat exchange effect of the intermediate heat exchanger 6 is weakened, the maximum heating capacity is increased by 12%, COP is increased by 6.8%, and the heating capacity of the air conditioning system is effectively exerted.

When a resistance of the third valve 30 to the refrigerant is smaller than a resistance of the first heat exchange portion 61 to the refrigerant, the refrigerant flowing out of the accumulator 2 will selectively flow back to the compressor 1 via the third valve 30. On the one hand, a pressure drop of the suction pipeline can be reduced, and on the other hand, the refrigerant entering the first heat exchange portion 61 can be reduced, and the heat exchange between the refrigerant in the first heat exchange portion 61 and the refrigerant in the second heat exchange portion 62 can be reduced, thereby greatly weakening the heat exchange effect of the intermediate heat exchanger 6, and effectively reducing the suction superheat degree of the compressor 1 in the heating mode.

Figure 19:
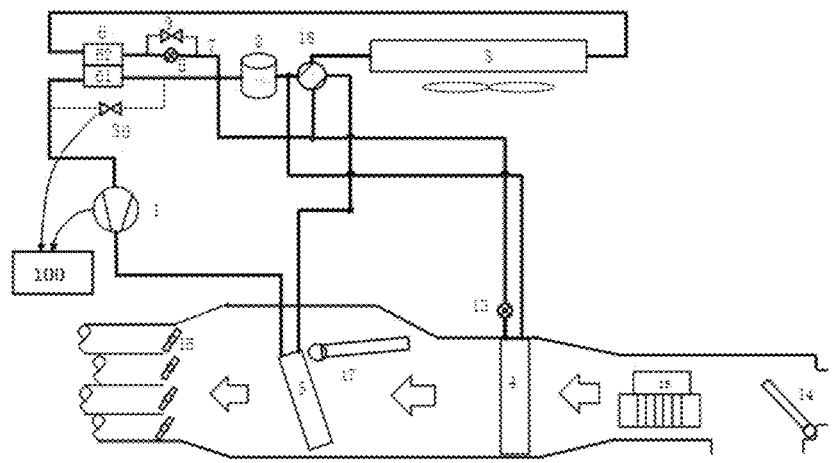
FIG. 19 is a schematic diagram of the air conditioning system in a first dehumidification mode according to the third embodiment of the present application.

3) In the first dehumidification mode, as shown in FIG. 19, the third valve 30 is closed or not communicated with the first branch, the first throttle element 13 is turned on, the throttle unit 8 is turned on, the valve unit 9 is at least partially turned off, the fluid switching valve 18 is in the second operation mode, the first port of the fluid switching valve 18 is in communication with the fourth port of the fluid switching valve 18, and the second port of the fluid switching valve 18 is in communication with the third port of the fluid switching valve 18. As illustrated by the heavy lines in FIG. 19, the circulation loop of the present embodiment includes two circulation loops. A first dehumidification circulation loop is: the compressor 1—the third heat exchanger 5—the fluid switching valve 18—the first throttle element 13—the second heat exchanger 4—the accumulator 2—the first heat exchange portion 61—the compressor 1. A second dehumidification circulation loop is: the compressor 1—the third heat exchanger 5—the fluid switching valve 18—the throttle unit 8—the second heat exchange portion 62—the first heat exchanger 3—the accumulator 2—the first heat exchange portion 61—the compressor 1. In the circulation, the compressor 1 consumes a certain amount of electrical energy to compress a low-temperature and low-pressure gaseous refrigerant into a high-temperature and high-pressure gaseous refrigerant, which is then supplied to the third heat exchanger 5. At the third heat exchanger 5, the opening degree of the second air door 17 is adjusted to choose whether the refrigerant exchanges heat with the indoor air flow. That is, when the temperature is relatively low, the third heat exchanger 5 exchanges heat with the indoor air flow; and when the temperature is relatively high, the third heat exchanger 5 does not exchange heat with the indoor air flow. The refrigerant, after flowing out of the third heat exchanger 5, partially passes the first throttle element 13 to be throttled and depressurized, and then reaches the second heat exchanger 4, in which the low-temperature and low-pressure liquid refrigerant exchanges heat with the indoor air flow. Since the second heat exchanger 4 has a surface temperature much lower than the temperature in the cabin, during this process, a dew point temperature of the air upstream of the second heat exchanger 4 is higher than the surface temperature of the second heat exchanger 4, so that moisture may be condensed and appear on the surface of the second heat exchanger 4 and then the moisture is discharged through the tube. Thus, the content of water vapor in the air in the cabin, i.e., a relative humidity, can be reduced, so as to achieve the purpose of dehumidification in the cabin. The refrigerant, after flowing out of the second heat exchanger 4, flows into and is separated by the accumulator 2, and then the fluid refrigerant is stored in the accumulator 2. The low-temperature and low-pressure gaseous refrigerant reaches the second end of the first heat exchange portion 61 of the intermediate heat exchanger 6 again. A part of the refrigerant flowing out of the third heat exchanger 5 can also pass through the throttle unit 8 to be throttled and depressurized, then flows into the second heat exchanger 62 and exchanges heat with the refrigerant flowing into the first heat exchanger 61, and then flows into the first heat exchanger 3. The low-temperature and low-pressure liquid refrigerant exchanges heat with the surrounding air in the first heat exchanger 3, then converges with the refrigerant flowing out of the second heat exchanger 4 to flow into the first heat exchange portion 61, and exchanges heat with the refrigerant in the second heat exchange portion 62 after being throttled and cooled through the throttle unit 8, and finally flows into the compressor 1.

In this embodiment, the indoor air flow is cooled and dehumidified through the second heat exchanger 4, is heated to a suitable temperature through the third heat exchanger 5, and then is supplied into the cabin through the air flue and grid 15, so as to provide users with a comfortable travel environment. The temperature control of the indoor air flow is achieved as follows. A ratio of the air flow passing through the third heat exchanger 5 can be determined by an opening angle of the second air door 17 as needed, and the air flow passing through the third heat exchanger 5 is heated, and then mixed with the original air flow until a desired temperature is reached. In addition, if the temperature is relatively high, the opening degree of the second air door 17 of the third heat exchanger 5 can be zero, allowing the air flue to bypass, such that the air is prevented from passing through the third heat exchanger 5. In this way, when the high-temperature and high-pressure gaseous refrigerant flows out of the compressor 1 and passes through the third heat exchanger 5, the second air door 17 is closed, such that the refrigerant passing through the third heat exchanger 5 will not exchange heat with the air flow. When the temperature is relatively low, the opening degree of the second air door 17 of the third heat exchanger 5 can be maximized, allowing the air to pass through the third heat exchanger 5, and the dehumidified air is heated and then supplied to the interior of the cabin or the window of the car through the air flue and grid 15. In this way, the temperature and humidity can be controlled at the same time, thereby improving comfortableness in the cabin.

Figure 20:
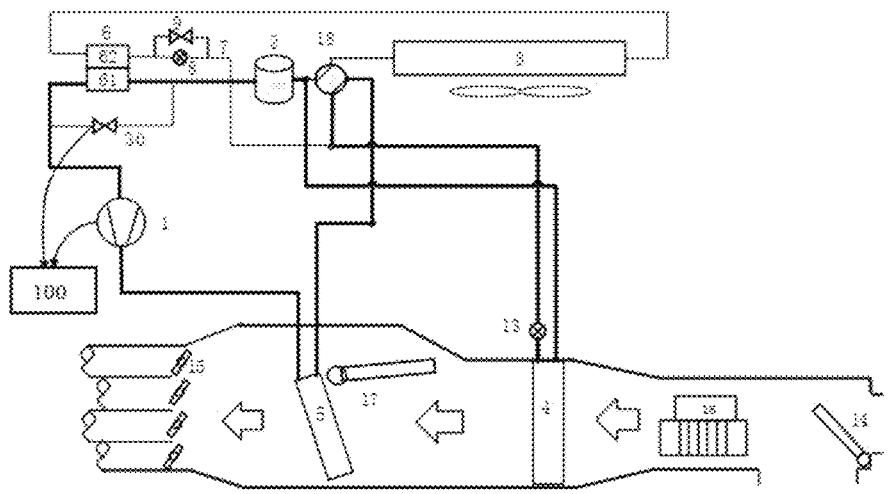
FIG. 20 is a schematic diagram of the air conditioning system in a second dehumidification mode according to the third embodiment of the present application.

4) In the second dehumidification mode, as shown in FIG. 20, the first throttle element 13 is turned on, the third valve 30 is closed or not communicated with the first branch, the valve unit 9 is at least partially turned off, the throttle unit 8 is turned off, and the fluid switching valve 18 is in the second operation mode. As illustrated with the heavy lines in FIG. 20, the refrigerant circulation loop of the second dehumidification mode is the same as the above-mentioned first dehumidification loop of the first dehumidification mode, which will not be repeated herein.

Figure 21:
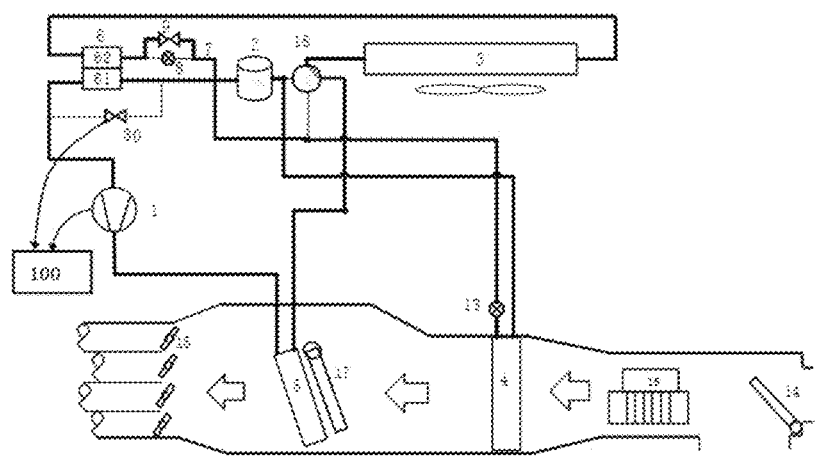
FIG. 21 is a schematic diagram of the air conditioning system in a defrost mode according to the third embodiment of the present application.

5) In the defrost mode, as shown in FIG. 21, the valve unit 9 is turned on, the throttle unit 8 is turned off, the first throttle element 13 is turned on, the third valve 30 is closed or not communicated with the first branch, and the fluid switching valve 18 is in the first operation mode. As illustrated with the heavy lines in FIG. 21, the defrost circulation loop is: the compressor 1—the third heat exchanger 5—the fluid switching valve 18—the first heat exchanger 3—the second heat exchange portion 62—the valve unit 9—the first throttle element 13—the second heat exchanger 4—the accumulator 2—the first heat exchange portion 61—the compressor 1. In the circulation, the air blower 16 is turned on, the second air door 17 has a certain opening degree, the air flow releases heat at the second heat exchanger 4 and exchanges heat to a certain extent at the third heat exchanger 5, and then is supplied into the cabin through the air flue and grid 15, thereby properly improving comfortableness in the cabin. In the circulation, the high-temperature and high-pressure refrigerant from the compressor 1 losses some heat after passing through the third heat exchanger 5 and then flows into the first heat exchanger 3 via the fluid switching valve 18, and the high-temperature refrigerant exchanges heat with a frost layer on the surface of the first heat exchanger 3 to achieve defrosting. The high-pressure refrigerant flowing out of the first heat exchanger 3, after being throttled and depressurized by the second heat exchange portion 62 and the first throttle element 13, flows into the second heat exchanger 4 to absorb heat, then flows into the first heat exchanger 61 for heat exchange, and finally flows into the compressor 1.

Figure 22:
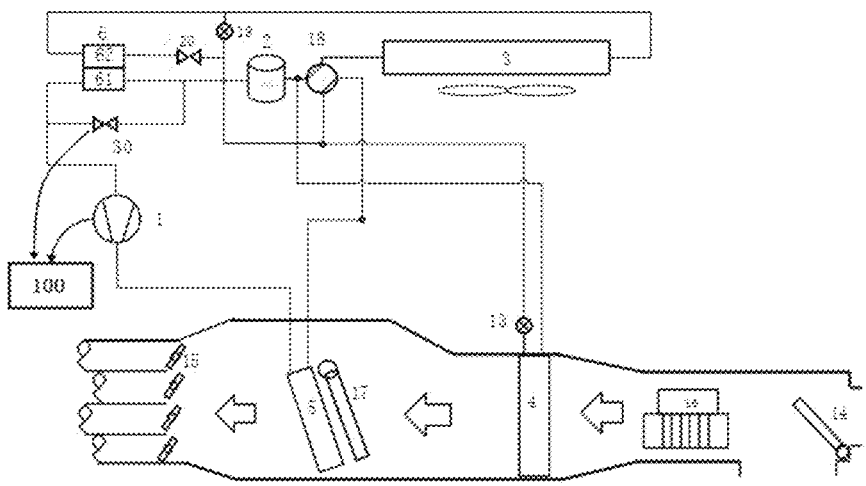
FIG. 22 is a schematic diagram of another structure of the air conditioning system according to the third embodiment of the present application.

FIG. 22 illustrates a second air conditioning system of the present embodiment, which is basically the same as the first air conditioning system of the present embodiment in terms of the composition structure and operating principles, and the difference lies in that: the air conditioning system further includes a third branch and a fourth branch, the third branch is provided with a third throttle element 19, the fourth branch includes a second valve 20 and a second heat exchange portion 62, the third branch and the fourth branch are connected in parallel, the outlet of the third heat exchanger 5 is communicable with the first end of the first heat exchanger 3 via the third branch, and the first end of the first heat exchanger 3 is communicable with the inlet of the second heat exchanger 4 via the fourth branch. The second valve 20 can be an electromagnetic valve or a one-way valve. If the second valve 20 is a one-way valve, a passage from the second end of the second heat exchange portion 62 to the first throttle element 13 or the third throttle element 19 is communicated, and it is uncommunicated in an opposite direction.

Operating principles of different operation modes of the present embodiment will be described as below.

1) In the refrigeration mode, the first throttle element 13 is turned on, the third throttle element 19 is turned on, the fluid switching valve 18 is in the second operation mode, the opening degree of the third valve 30 is adjusted as needed, and the second valve 20 is communicated, such that the fourth branch from the second end of the second heat exchange portion 62 to the first throttle element 13 is communicated. The refrigeration mode of the present embodiment includes two circulation loops. A first refrigeration circulation loop is: the compressor 1—the third heat exchanger 5—the fluid switching valve 18—the first heat exchanger 3—the second heat exchange portion 62—the second valve 20—the first throttle element 13—the second heat exchanger 4—the accumulator 2—the first heat exchange portion 61—the compressor 1; and a second refrigeration circulation loop is: the compressor 1—the third heat exchanger 5—the fluid switching valve 18—the first heat exchanger 3—the second heat exchange portion 62—the second valve 20—the first throttle element 13—the second heat exchanger 4—the accumulator 2—the third valve 30—the compressor 1.

2) In the heating mode, the third valve 30 can be turned on or communicate with the first branch, the second valve 20 is uncommunicated, the first throttle element 13 is turned off, the third throttle element 19 is turned on, and the fluid switching valve 18 is in the second operation mode. The heating circulation loop of the present embodiment is: the compressor 1—the third heat exchanger 5—the fluid switching valve 18—the third throttle element 19—the first heat exchanger 3—the fluid switching valve 18—the accumulator 2—the first heat exchange portion 61—the compressor 1.

During the heating circulation of the present application, as the second valve 20 is uncommunicated, no flowing refrigerant enters the second heat exchange portion 62. Thus, the intermediate heat exchanger 6 does not has an effect of backheating, thereby effectively reducing the suction superheat degree of the compressor 1 in the heating mode.

3) The first dehumidification mode includes two circulation loops. A first dehumidification circulation loop is the same as the first dehumidification circulation loop of the first air conditioning system provided in the present embodiment, which will not be described in detail herein; and a second dehumidification circulation loop is: the compressor 1—the third heat exchanger 5—the fluid switching valve 18—the third throttle element 19—the first heat exchanger 3—the fluid switching valve 18—the accumulator 2—the first heat exchange portion 61—the compressor 1. In the circulation, a part of the refrigerant flowing out of the third heat exchanger 5 can be throttled and depressurized by the third throttle element 19, the low-temperature and low-pressure liquid refrigerant, after exchanging heat with the surrounding air in the first heat exchanger 3, converges with the refrigerant flowing out of the second heat exchanger 4 to flow into the first heat exchange portion 61, and then flows into the compressor 1.

4) The second dehumidification mode is basically the same as the second dehumidification circulation loop of the first air conditioning system provided by the present embodiment, which will not be described in detail herein.

5) In the defrost mode, the first throttle element 13 is turned on, the third valve 30 is closed or uncommunicated with the first branch, the third throttle element 19 is turned off, the second valve 20 is communicated, and the fluid switching valve 18 is in the first operation mode. The defrost circulation loop of the present embodiment is: the compressor 1—the third heat exchanger 5—the fluid switching valve 18—the first heat exchanger 3—the second heat exchange portion 62—the second valve 20—the first throttle element 13—the second heat exchanger 4—the accumulator 2—the first heat exchange portion 61—the compressor 1. The operating principles are the same as the defrost mode of the first air conditioning system provided in the present embodiment, which will not be described in detail herein.

Figure 23:
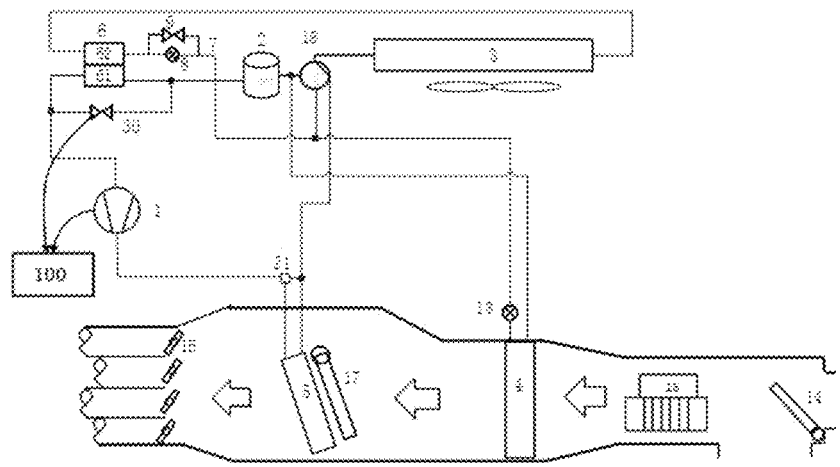
FIG. 23 is a schematic diagram of yet another structure of the air conditioning system according to the third embodiment of the present application.

FIG. 23 illustrates a third air conditioning system of the present embodiment, which is basically the same as the first air conditioning system of the present embodiment in terms of the composition structure and operating principles, and the difference lies in that: a three-way valve 21 is provided on the pipeline between the outlet of the compressor 1 and the inlet of the third heat exchanger 5, the three-way valve 21 includes a first port, a second port, and a third port, the first port of the three-way valve 21 is in communication with the outlet of the compressor 1, the second port of the three-way valve 21 is in communication with the inlet of the third heat exchanger 5, and the third port of the three-way valve 21 is communicable with the outlet of the third heat exchanger 5 and/or the first port of the fluid switching valve 18, such that the third heat exchanger 5 and the fifth branch are connected in parallel. During the cooling in the summer, the high-temperature and high-pressure refrigerant flowing out of the compressor 1 passes through the three-way valve 21 and directly flows into the first heat exchanger 3 via the fifth branch, or a part of the high-temperature and high-pressure refrigerant flows into the first heat exchanger 3 through the third heat exchanger 5 by adjusting the opening degree of the three-way valve 21. Since the high-temperature refrigerant does not completely flow through the third heat exchanger 5, the material of the conditioning cabinet is less required in terms of resistance to high-temperature. In the meantime, although the second air door 17 is closed, if all the high-temperature and high-pressure refrigerant flowing out of the compressor 1 passes through the third heat exchanger 5, the third heat exchanger 5 is still a heat source, thereby affecting the comfortableness of the passenger cabinet. By providing the three-way valve 21 between the outlet of the compressor 1 and the inlet of the third heat exchanger 5, the high-temperature and high-pressure refrigerant does not completely pass through the third heat exchanger, reducing the affection on the comfortableness in the passenger cabinet.

In addition, in the dehumidification mode (including the first dehumidification mode and the second dehumidification mode), at least a part of the high-temperature and high-pressure refrigerant flowing out of the compressor 1 passes through the third heat exchanger 5 by adjusting the opening degree of the three-way valve 21. By adjusting the opening degree of the second air door 17, a part of the low-temperature air flow that has exchanged heat with the second heat exchanger 4 flows through the third heat exchanger 5 and exchanges heat with the high-temperature refrigerant in the third heat exchanger 5, and the low-temperature air flow, after being heated, is supplied to the passenger cabinet through the grid 15, thereby improving comfortableness in the passenger cabinet.

Further, the operating principles of the heating mode and the defrost mode are basically the same as those of the first air conditioning system provided in the present embodiment, which will not be described in detail herein.

Fourth Embodiment

The air conditioning system provided in the present embodiment is basically the same as that provided in the third embodiment in terms of the composition structure and operating principles, and the difference lies in that: the accumulator 2 includes a first port 23, a second port 22, and a third port 25 closed to or located at a bottom of the accumulator, and the first branch is provided between the first end of the first heat exchange portion 61 and the third port 25 of the accumulator 2. The first port of the third valve 30 is in communication with the third port 25 of the accumulator 2, the second port of the third valve 30 is in communication with the inlet of the compressor 1, and the third port of the third valve 30 is in communication with the first end of the first heat exchange portion 61. In this case, the third valve 30 can be an electromagnetic three-way valve, and a ratio of an amount of the refrigerant flowing out of the third port 25 of the accumulator 2 to an amount of the refrigerant flowing out of the first heat exchange portion 61 can be adjusted by controlling an opening degree of the electromagnetic three-way valve.

The accumulator 2 includes a housing 24 forming a separation chamber, the first port 23 and the second port 22 are provided on a top of the housing 24, and a gas-liquid separation component 26 is provided in the separation chamber. The gas-liquid refrigerant flows into the separation chamber via the second port 22, the gas-liquid separation component 26 allows the liquid refrigerant to be separated from the gaseous refrigerant, the liquid refrigerant is remained at the bottom of the separation chamber under the effect of gravity, and the gaseous refrigerant flows out via the first port 23. Further, the accumulator 2 is provided with the third port 25 in communication with the separation chamber, and the liquid refrigerant at the bottom of the separation chamber flows out via the third port 25. Generally, the third port 25 is located at the bottom of the separation chamber, and it can also be located at a side wall of the housing 24. Specifically, the gas-liquid separation component 26 of the accumulator 2 is a U-shaped pipe 262 and a liquid inlet pipe 261 shown in FIG. 31, or it may also have other structures having a gas-liquid separation function, such as a separation plate and a sleeve. In addition, it can be understood that the first port 23 and the second port 22 may also be located at a position of the side wall of the housing close to the top.

FIGS. 24-28 illustrate the first air conditioning system provided in the present embodiment.

Operating principles of different operation modes of the present embodiment will be described as below.

Figure 24:
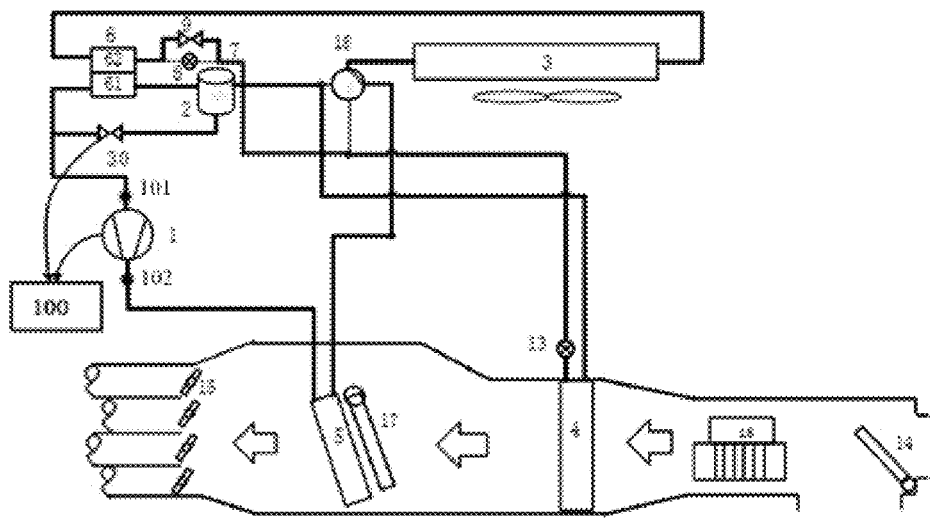
FIG. 24 is a schematic diagram of an air conditioning system in a refrigeration mode according to a fourth embodiment of the present application.

1) The refrigeration mode, as shown in FIG. 24, is basically the same as the refrigeration mode of the first air conditioning system provided in the third embodiment, and the difference merely lies in that: the opening degree of the third valve 30 or the amount of the refrigerant flowing out of the third port 25 of the accumulator 2 is adjusted as needed. The low-temperature and low-pressure gaseous refrigerant flowing out of the third port 25 of the accumulator 2 is mixed with the relatively high-temperature refrigerant flowing out of the first end of the first heat exchange portion 61 and together flow into the compressor 1, such that the heat exchange capability of the intermediate heat exchanger 6 is weakened.

Figure 25:
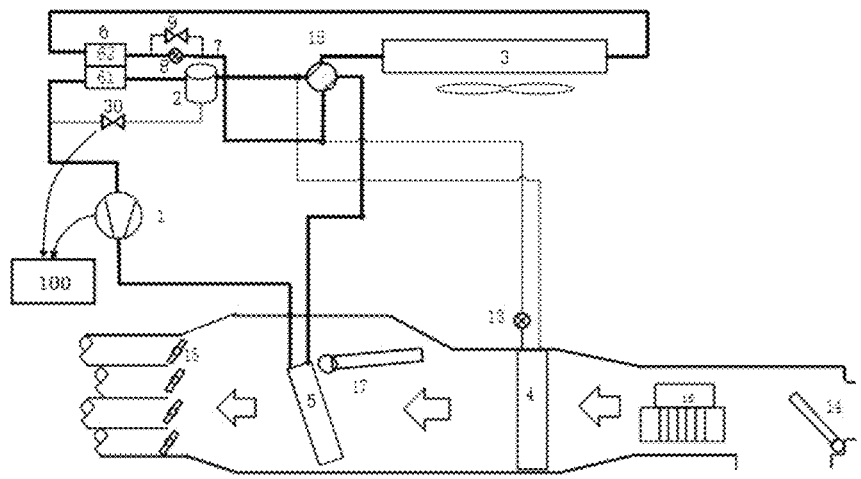
FIG. 25 is a schematic diagram of the air conditioning system in a heating mode according to the fourth embodiment of the present application.
Figure 26:
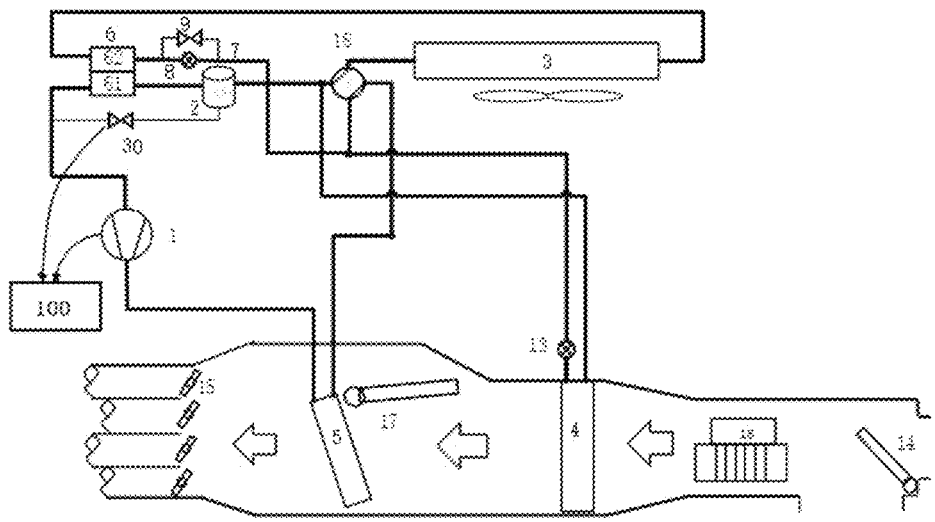
FIG. 26 is a schematic diagram of the air conditioning system in a first dehumidification mode according to the fourth embodiment of the present application.
Figure 27:
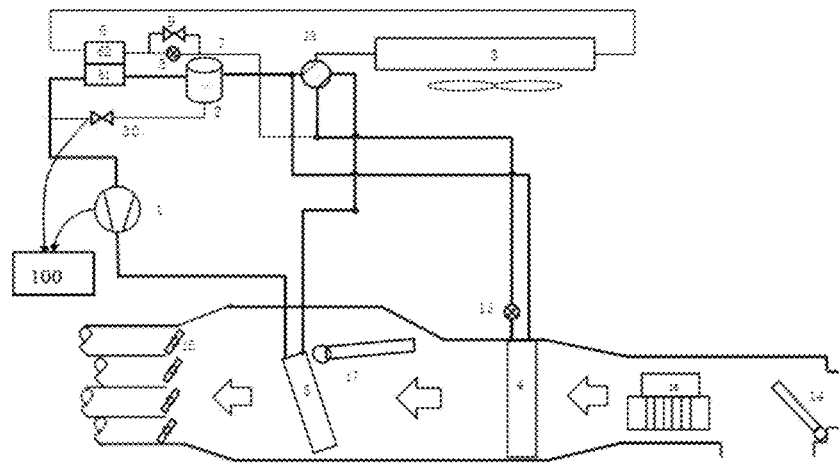
FIG. 27 is a schematic diagram of the air conditioning system in a second dehumidification mode according to the fourth embodiment of the present application.
Figure 28:
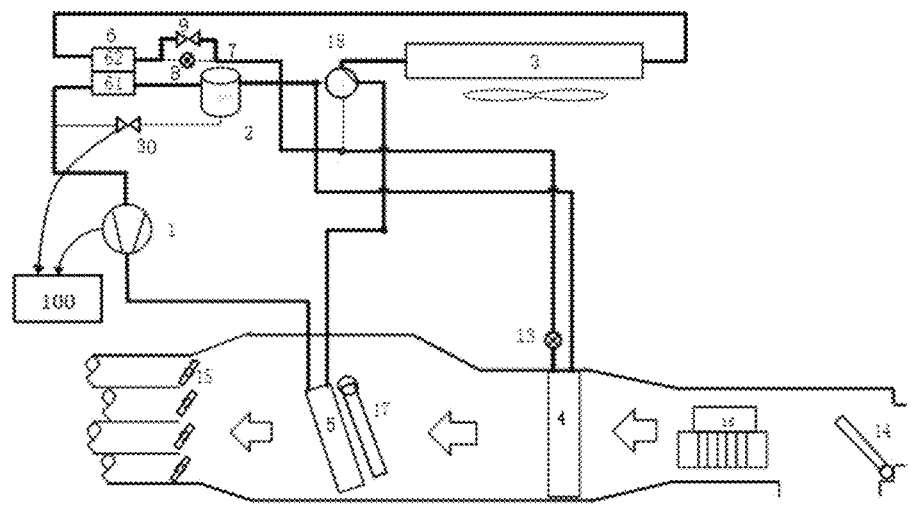
FIG. 28 is a schematic diagram of the air conditioning system in a defrost mode according to the fourth embodiment of the present application.

2) The heating mode (as shown in FIG. 25), the first dehumidification mode (as shown in FIG. 26), the second dehumidification mode (as shown in FIG. 27), and the defrost mode (as shown in FIG. 28) are basically the same as those of the first air conditioning system provided in the third embodiment, and the difference merely lies in that the third valve 30 is closed or does not communicate the third port of the accumulator 2 with the inlet of the compressor 1, which will not be described in detail herein.

Figure 29:
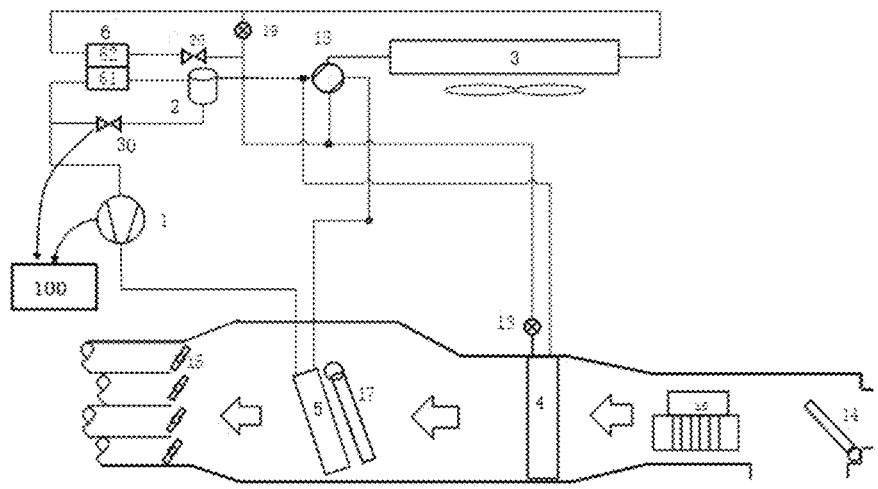
FIG. 29 is a schematic diagram of another structure of the air conditioning system according to the fourth embodiment of the present application.

FIG. 29 illustrates a second air conditioning system provided in the present embodiment, which is basically the same as the first air conditioning system provided in the third embodiment, which will not be described in detail herein.

The different operation modes of the present embodiment are basically the same as the second air conditioning system provided in the third embodiment in terms of the composition structure and operating principles, and the difference merely lies in that:

1) in the refrigeration mode, the opening degree of the third valve 30 or the amount of the refrigerant flowing out of the third port 25 of the accumulator 2 is adjusted as needed;

2) in the heating mode, the third valve 30 is closed; and 3) in the defrost mode, the third valve 30 is closed or uncommunicated with the third port 25 of the accumulator 2 and the inlet of the compressor 1.

FIG. 30 illustrates a third air conditioning system provided in the present embodiment, which is basically the same as the first air conditioning system provided in the third embodiment in terms of the composition structure and operating principles and will not be described in detail herein.

The third air conditioning system is basically the same as the first air conditioning system provided in the present embodiment in terms of the composition structure and operating principles, and the difference lies in that: a three-way valve 21 is provided on the pipeline between the outlet of the compressor 1 and the inlet of the third heat exchanger 5, the three-way valve 21 includes a first port, a second port and a third port, the first port of the three-way valve 21 is in communication with the outlet of the compressor 1, the second port of the three-way valve 21 is in communication with the inlet of the third heat exchanger 5, and the third port of the three-way valve 21 is communicable with the outlet of the third heat exchanger 5 and/or the first port of the fluid switching valve 18, such that the third heat exchanger 5 and the fifth branch are connected in parallel. During the cooling in the summer, the high-temperature and high-pressure refrigerant flowing out of the compressor 1 passes through the three-way valve 21 and directly flows into the first heat exchanger 3 via the fifth branch, or a part of the high-temperature and high-pressure refrigerant flows into the first heat exchanger 3 through the third heat exchanger 5 by adjusting the opening degree of the three-way valve 21. Since the high-temperature refrigerant does not completely flow through the third heat exchanger 5, the material of the conditioning cabinet is less required in terms of resistance to high-temperature. In the meantime, although the second air door 17 is closed, if all the high-temperature and high-pressure refrigerant flowing out of the compressor 1 passes through the third heat exchanger 5, the third heat exchanger 5 is still a heat source, thereby affecting the comfortableness of the passenger cabinet. By providing the three-way valve 21 between the outlet of the compressor 1 and the inlet of the third heat exchanger 5, the high-temperature and high-pressure refrigerant does not completely pass through the third heat exchanger, thereby reducing the affection on the comfortableness in the passenger cabinet.

In addition, in the dehumidification mode (including the first dehumidification mode and the second dehumidification mode), at least a part of the high-temperature and high-pressure refrigerant flowing out of the compressor 1 passes through the third heat exchanger 5 by adjusting the opening degree of the three-way valve 21. By adjusting the opening degree of the second air door 17, a part of the low-temperature air flow that has exchanged heat with the second heat exchanger 4 flows through the third heat exchanger 5 and exchanges heat with the high-temperature refrigerant in the third heat exchanger 5, and the low-temperature air flow, after being heated, is supplied to the passenger cabinet through the grid 15, thereby improving comfortableness in the passenger cabinet.

Further, the operating principles of the heating mode and the defrost mode are basically the same as those of the first air conditioning system provided in the present embodiment, which will not be described in detail herein.

Figure 6:
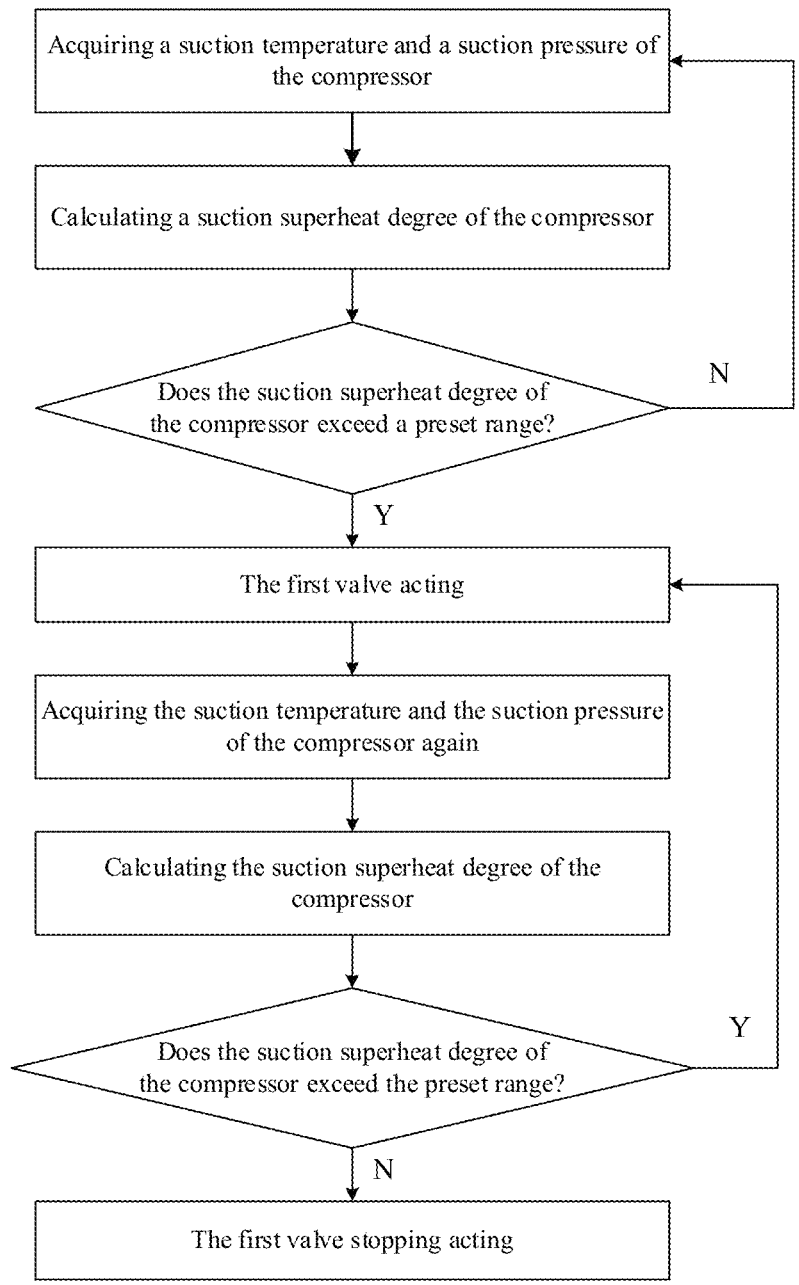
FIG. 6 is a flow diagram of a control method for the air conditioning system according to the first embodiment of the present application.

As shown in FIG. 6, a first control method for the air conditioning system provided in the embodiments of the present application, which is applied to the air conditioning system of the above-mentioned embodiments, includes the following steps.

First, a suction temperature and a suction pressure of the compressor 1 are acquired by a sensor 101 provided at the inlet of the compressor 1.

Then, a suction superheat degree of the compressor 1 is obtained by calculation of the acquired suction temperature and suction pressure, and it is determined whether the suction superheat degree of the compressor 1 exceeds a preset range of degree of suction temperature or not.

If the suction superheat degree of the compressor 1 exceeds the preset range, the control device 100 controls an action of the first branch, and then the sensor 101 acquires the suction temperature and the suction pressure again, and at the same time the suction superheat of the compressor 1 is calculated. If the suction superheat degree of the compressor 1 still exceeds the preset range, the above action of the first branch is maintained, then the sensor 101 obtains the suction temperature and the suction pressure again, and the suction superheat of the compressor 1 is calculated again, until the suction superheat degree of the compressor 1 does not exceed the preset range; and if the obtained suction superheat degree of the compressor 1 does not exceed the preset range, the control device 100 controls the first branch to stop the action.

Figure 7:
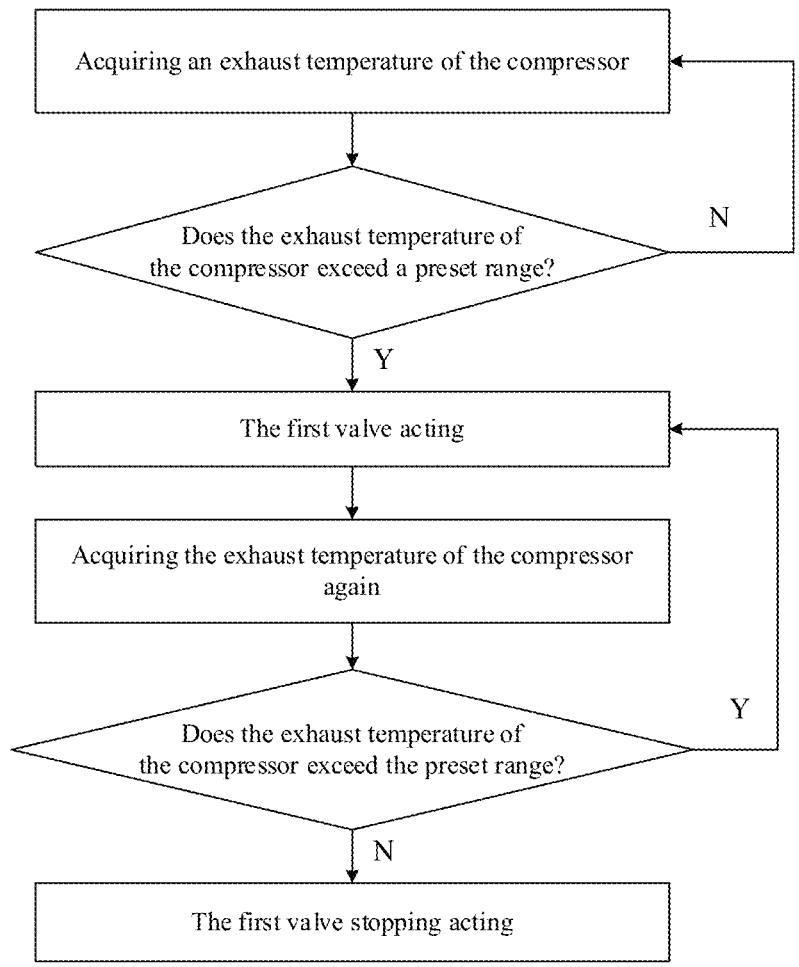
FIG. 7 is a flow diagram of another control method for the air conditioning system according to the first embodiment of the present application.

As shown in FIG. 7, a second control method for the air conditioning system provided in the embodiments of the present application, which is applied to the air conditioning system of the above-mentioned embodiments, includes the following steps.

First, an exhaust temperature of the compressor 1 is acquired by a sensor 102 provided at the outlet of the compressor.

Then, it is determined whether the exhaust temperature of the compressor 1 exceeds a preset range of exhaust temperature or not.

If the exhaust temperature of the compressor 1 exceeds the preset range, the control device 100 controls an action of the first branch, and the sensor 102 acquires the exhaust temperature of the compressor 1 again;

If the newly acquired exhaust temperature of the compressor 1 still exceeds the preset range, the above-mentioned action of the first branch is maintained, and then the sensor 102 acquires the exhaust temperature of the compressor 1 again, until the exhaust temperature of the compressor 1 does not exceed the preset range. If the newly acquired exhaust temperature of the compressor 1 does not exceed the preset range, the control device 100 controls the first branch to stop the action.

Figure 8:
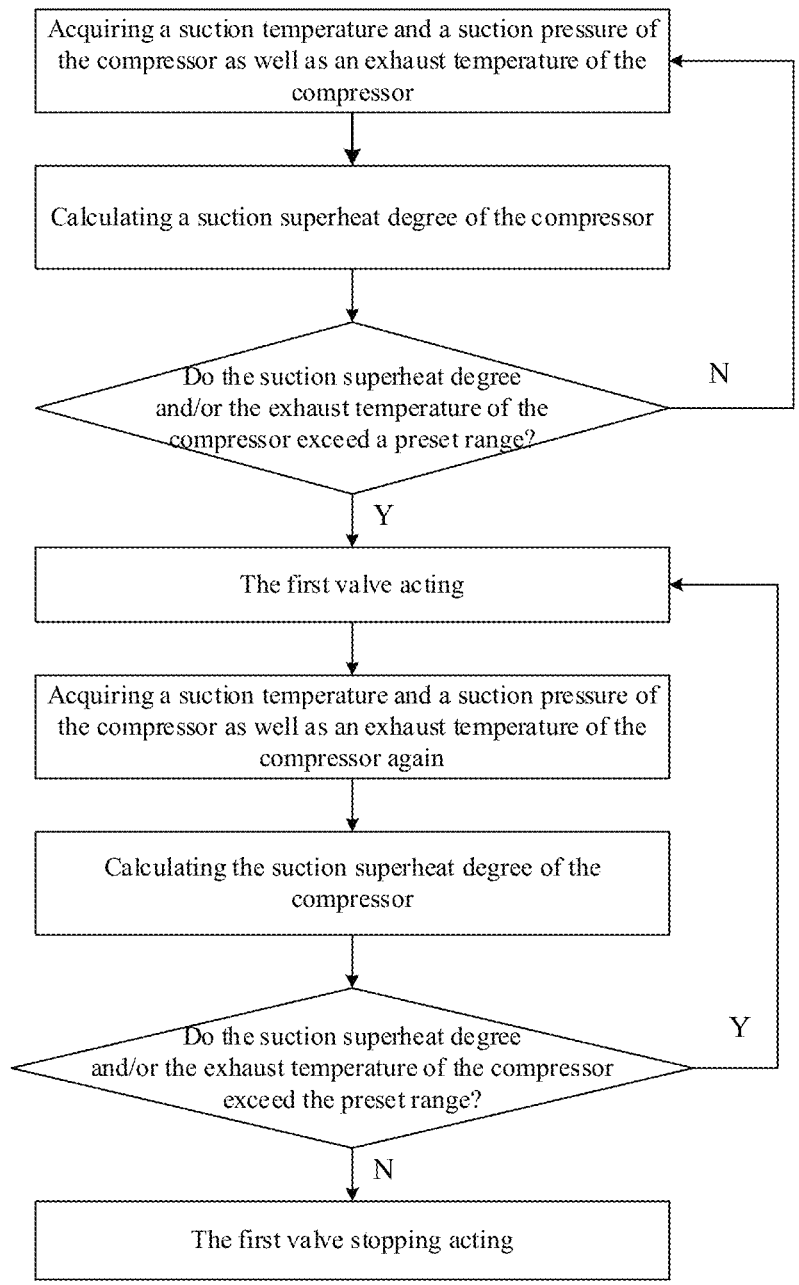
FIG. 8 is a flow diagram of yet another control method for the air conditioning system according to the first embodiment of the present application.

As shown in FIG. 8, a third control method for the air conditioning system provided in the embodiments of the present application includes the following steps.

First, a suction temperature and a suction pressure of the compressor 1 are acquired by a sensor 101 provided at the inlet of the compressor 1, and meanwhile, an exhaust temperature of the compressor 1 is acquired by a sensor 102 provided at the outlet of the compressor.

Then, a suction superheat degree of the compressor 1 is obtained by calculating with the acquired suction temperature and suction pressure, it is determined whether the suction superheat degree of the compressor 1 exceeds a preset range of suction superheat degree or not, and meanwhile, it is determined whether the exhaust temperature of the compressor 1 exceeds a preset range of exhaust temperature or not.

If at least one of the suction superheat degree and the exhaust temperature of the compressor 1 exceeds the preset range, the control device 100 controls an action of the first branch, and then the sensor acquires the suction superheat degree and the exhaust temperature of the compressor 1 again.

If at least one of the newly acquired suction superheat degree and exhaust temperature of the compressor 1 exceeds the preset range, the above-mentioned action of the first branch is maintained, and then the suction superheat degree and the exhaust temperature of the compressor 1 are acquired again, until both the suction superheat degree and the exhaust temperature of the compressor 1 do not exceed the preset ranges. If both the newly acquired suction superheat degree and exhaust temperature of the compressor 1 do not exceed the preset ranges, the control device 100 controls the first branch to stop the action.

The above-mentioned control methods are applicable for the refrigeration mode.

The above-mentioned action of the first branch is performed in any one of the followings manners:
1) the first valve 29 acts, for example, the first valve 29 is turned on or the opening degree of the first valve 29 is adjusted to be greater;
2) the second throttle element 10 acts, for example, the second throttle element 10 is turned on, or the opening degree of the second throttle element 10 is adjusted to be greater; and
3) the third valve 30 acts, for example, the third valve 30 is turned on, or the opening degree of the third valve 30 is adjusted to be greater.

The first branch stops the action in any one of the followings manners:
1) the first valve 29 stops acting, for example, the first valve 29 is closed or the opening degree of the first valve 29 is adjusted to be smaller;
2) the second throttle element 10 stops acting; and
3) the third valve 30 stops acting.

Figure 34:
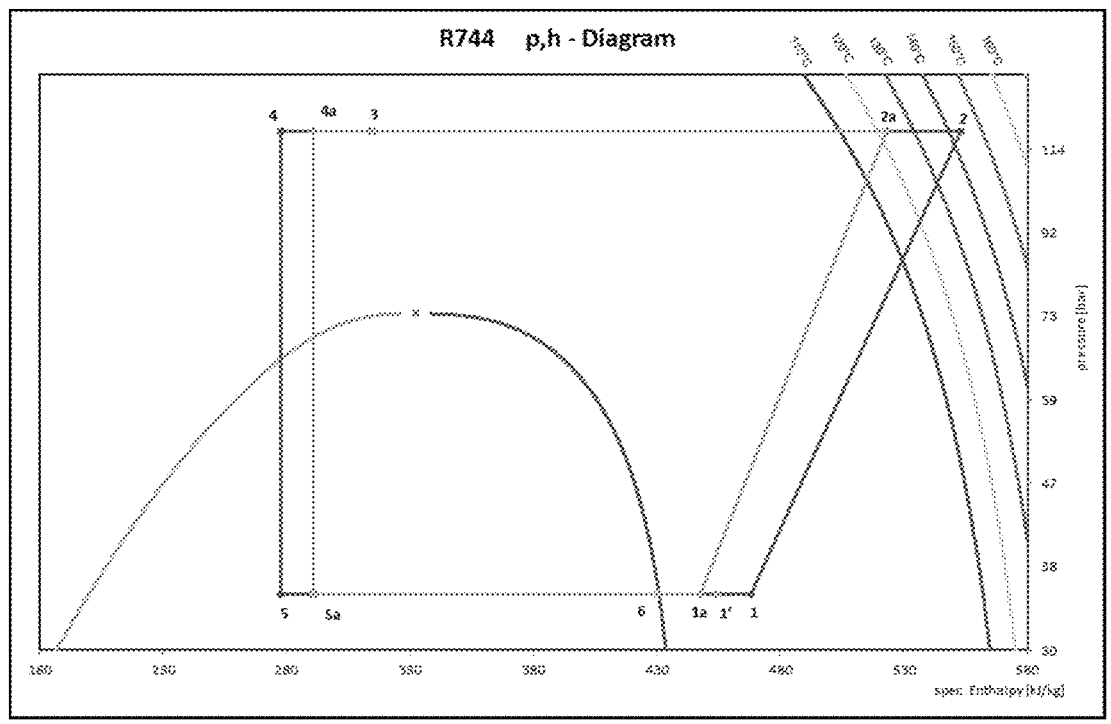
FIG. 34 is a pressure-enthalpy diagram of an air conditioning system according to an embodiment of the present application.

Taking the first branch provided with the third valve 30 as an example, the control methods of the above-mentioned air conditioning systems have operating principles shown in FIG. 34. For example, $CO_2$ is used as the refrigerant, the third valve 30 is completely closed, the refrigerant circulation is: 1-2-3-4-5-6-1, in which the processes of 6-1 and 3-4 are heat exchanges occurring in the intermediate heat exchanger 6, the refrigerant flowing out of the first heat exchanger 3, after releasing heat, flows from point 3 to point 4, and the low-pressure saturated gas flowing out of the accumulator 2, after absorbing heat, flows from point 6 to point 1. If the temperature is relatively high at point 1, the refrigerant passing through the compressor reaches point 2, and the temperature at point 2 is close to 150° C., which reaches an upper limit of the operation of the compressor, thereby affecting the normal operation of the compressor. In this embodiment, in order to prevent the temperature at point 2 from being too high, the opening degree of the third valve member 30 is adjusted to change the refrigerant circulation as: 1$a$-2$a$-3-4$a$-5$a$-6-1'-1$a$. In this case, the heat exchange capacity of the intermediate heat exchanger 6 is partially exerted (6-1' and 3-4$a$ change in the intermediate heat exchanger 6), and a part of the low-pressure saturated gas flowing out of the accumulator 2 absorbs heat and flows from point 6 to point 1', and then mixed with another part of low-pressure saturated gas to reach the state point 1$a$, flows into the compressor 1, and reaches point 2$a$ after passing through the compressor 1. At this time, the temperature at point 2$a$ is significantly lower than 150° C.

Since the low-pressure saturated liquid refrigerant 1$c$ at the bottom of the accumulator 2 has a large latent heat, only a small amount thereof is required to be mixed with the refrigerant flowing out of the intermediate heat exchanger 6 to achieve a change from 1-1$a$. For example, the acquiring and determination of the exhaust temperature of the compressor 1 include:

first of all, when the third valve 30 is in a closed state, acquiring the exhaust temperature of the compressor 1 by a sensor 102 provided at the outlet of the compressor;

determining whether the exhaust temperature of the compressor 1 exceeds a preset range of exhaust temperature or not;

calculating a value of m2 based on an equation: $m2*h1c+m1*h1=(m2+m1)*h1a$, where m1 represents an amount of the refrigerant flowing into the compressor 1 via the intermediate heat exchanger 6, h1$c$ represents an enthalpy of the low-pressure saturated liquid refrigerant at the bottom of the accumulator 2, h1 represents an enthalpy of the refrigerant flowing into the compressor, and h1$a$ represents an the enthalpy of the refrigerant flowing into the compressor that is formed by mixing two parts of refrigerant.

If the exhaust temperature of the compressor 1 exceeds the preset range, the control device 100 controls the third valve 30 to act (for example, the third valve 30 is opened or the opening degree of the third valve 30 is adjusted to be greater or the amount of the refrigerant flowing out of the third port 25 of the accumulator 2 is increased), so as to adjust the opening degree. The amount of the refrigerant flowing out of the third port of the accumulator 2 is compared with the target mass m2, and then the sensor 102 acquires the exhaust temperature of the compressor 1 again.

If the amount of the refrigerant flowing out of the third port 25 of the accumulator 2 is not greater than the target mass m2, the newly acquired exhaust temperature of the compressor 1 does not exceed the preset range. Then, the control device 100 controls the third valve 30 to stop acting.

The above-mentioned control methods flexibly adjust the opening degree of the third valve member 30 based on the exhaust temperature of the compressor 1, thereby changing the heat exchange capacity of the intermediate heat exchanger 6. In this way, the exhaust temperature of the compressor 1 can be effectively controlled, and thus the compressor 1 can operate at a high frequency and high efficiency.

In addition, the control device 100 can also determine at the same time whether the exhaust temperature and the suction superheat degree exceed the preset ranges. If the exhaust temperature and/or the suction superheat degree exceed the preset ranges, the control device 100 controls the third valve 30 to act. If the exhaust temperature and/or the suction superheat degree do not exceed the preset ranges, the control device 100 controls the third valve 30 to stop acting.

It should be noted that the above are merely the preferred embodiments of the present application and the applied technical principles. Those skilled in the art can understand that the present application is not limited to the specific embodiments described herein, and those skilled in the art can make various obvious modifications, readjustments, and substitutions without departing from the protection scope of the present application. Therefore, although the present application has been described in detail through the above embodiments, the present application is not limited to the above embodiments, and may include other equivalent embodiments without departing from the concept of the present application. The scope is determined by the scope of the appended claims.

What is claimed is:

1. A control method for an air conditioning system, applied to an air conditioning system,
    wherein the air conditioning system comprises a compressor, a first heat exchanger, a second heat exchanger, an intermediate heat exchanger, a first branch, and a first throttle element disposed at an inlet of the second heat exchanger;
    wherein the intermediate heat exchanger comprises a first heat exchange portion and a second heat exchange portion, the first heat exchange portion and the second heat exchange portion are capable of heat exchanging, a first end of the first heat exchange portion is in communication with an inlet of the compressor, a second end of the first heat exchange portion is communicable with an outlet of the second heat exchanger, a first end of the second heat exchange portion is communicable with a first end of the first heat exchanger, and a second end of the second heat exchange portion is communicable with at least one of the inlet of the second heat exchanger or an outlet of the compressor; and
    wherein the air conditioning system is configured to operate in a refrigeration mode, in which an amount of flow in the first branch is adjustable, and the first branch is configured to:
        be arranged between the first end and the second end of the first heat exchange portion, and the first branch is provided with a valve,
    wherein the valve is configured with an adjustable opening degree, such that at least a part of refrigerant flowing out of the second heat exchanger flows into the compressor via the first branch, and
    wherein the method comprises, comprising, in the refrigeration mode:
        acquiring a suction temperature and a suction pressure of the compressor by a sensor provided at the inlet of the compressor;
        calculating a suction superheat degree of the compressor based on the suction temperature and the suction pressure, and determining whether the suction superheat degree of the compressor exceeds a preset range;
        in response to determining that the suction superheat degree of the compressor exceeds the preset range, acting on the first branch in such a manner that the amount of flow of the first branch is adjusted, acquiring the suction temperature and the suction pressure again, and calculating the suction superheat degree; and
        in response to determining that the suction superheat degree of the compressor does not exceed the preset range, stopping the acting on the first branch.

* * * * *